United States Patent
Zeng et al.

(10) Patent No.: US 12,218,354 B2
(45) Date of Patent: Feb. 4, 2025

(54) NEGATIVE-ELECTRODE ACTIVE MATERIAL AND PREPARATION METHOD THEREOF, SECONDARY BATTERY, AND BATTERY MODULE, BATTERY PACK, AND APPARATUS CONTAINING SUCH SECONDARY BATTERY

(71) Applicant: CONTEMPORARY AMPEREX TECHNOLOGY (HONG KONG) LIMITED, Hong Kong (CN)

(72) Inventors: Yuqun Zeng, Ningde (CN); Baida Deng, Ningde (CN); Meng Kang, Ningde (CN); Erling Li, Ningde (CN); Libing He, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 17/822,260

(22) Filed: Aug. 25, 2022

(65) Prior Publication Data

US 2022/0416244 A1 Dec. 29, 2022

Related U.S. Application Data

(63) Continuation of application No. PCT/CN2020/121268, filed on Oct. 15, 2020.

(51) Int. Cl.
*H01M 4/04* (2006.01)
*H01M 4/02* (2006.01)
(Continued)

(52) U.S. Cl.
CPC ......... *H01M 4/583* (2013.01); *H01M 4/0471* (2013.01); *H01M 4/622* (2013.01);
(Continued)

(58) Field of Classification Search
None
See application file for complete search history.

(56) References Cited

U.S. PATENT DOCUMENTS

2018/0241038 A1   8/2018   Takeda

FOREIGN PATENT DOCUMENTS

| CN | 102227020 A | 10/2011 |
|---|---|---|
| CN | 103367749 A | 10/2013 |

(Continued)

OTHER PUBLICATIONS

International Search Report of Application No. PCT/CN2020/121268, mailed Mar. 26, 2021.

(Continued)

*Primary Examiner* — Tracy M Dove
(74) *Attorney, Agent, or Firm* — Ladas & Parry LLP

(57) ABSTRACT

This application discloses a negative-electrode active material and a preparation method thereof, a secondary battery, and a battery module, a battery pack, and an apparatus that include such secondary battery. The negative-electrode active material includes a core and a coating layer covering at least part of a surface of the core, where the core includes artificial graphite, the coating layer includes amorphous carbon, a volume-based particle size distribution of the negative-electrode active material satisfies $D_v99 \leq 24$ μm, a volume-based median particle size $D_v50$ of the negative-electrode active material satisfies $8 \mu m \leq D_v \leq 15$ μm, $D_v99$ is a particle size corresponding to a cumulative volume distribution percentage of the negative-electrode active material reaching 99%, and WO is a particle size corresponding to a cumulative volume distribution percentage of the negative-electrode active material reaching 50%.

6 Claims, 6 Drawing Sheets

(51) Int. Cl.
  *H01M 4/583* (2010.01)
  *H01M 4/62* (2006.01)
(52) U.S. Cl.
  CPC ...... *H01M 4/625* (2013.01); *H01M 2004/021* (2013.01); *H01M 2004/027* (2013.01)

(56) References Cited

FOREIGN PATENT DOCUMENTS

| | | |
|---|---|---|
| CN | 108155351 A | 6/2018 |
| CN | 109841831 A | 6/2019 |
| CN | 110767888 A | 2/2020 |
| CN | 110931788 A | 3/2020 |
| CN | 111554898 A | 8/2020 |
| JP | 2012216532 A | 11/2012 |
| JP | 2018006270 A | 1/2018 |
| JP | 2018088404 A | 6/2018 |
| JP | 2019528559 A | 10/2019 |
| KR | 101708360 B1 | 2/2017 |
| KR | 20180070302 A | 8/2019 |
| KR | 10-2020-0076498 A | 6/2020 |
| WO | 2010110441 A1 | 9/2010 |
| WO | 2015190833 A1 | 12/2015 |
| WO | 2017057123 A1 | 4/2017 |
| WO | 2017065586 A1 | 4/2017 |
| WO | 2019124425 A1 | 6/2019 |
| WO | 2020187106 A1 | 9/2020 |

OTHER PUBLICATIONS

Written Opinion of Application No. PCT/CN2020/121268, mailed Mar. 26, 2021.
General rules for analytical scanning electron microscopy, Chinese industrial standard JY/T 010-1996, Published Jan. 23, 1997.
General rules for X-ray diffractometric analysis, Japanese Industrial Standard JIS K 0131, 1996.
Determination method of artificial graphite lattice parameter, Chinese Industrial Standard, JB/T 4220-2011, published Dec. 20, 2011.
Petroleum products Determination of carbon residue Conradson method, Chinese national standard GB 268-87, May 12, 1987.
Metallic powders—Determination of tap density, Chinese national standard GB/T 5162-2006/ISO 3953:1993, published Jul. 18, 2006.
Method for determination of coking value of coal pitch products, Chinese national standard GB/T 8727-2008.
Particle size analysis—Laser diffraction methods, Chinese national standard GB/T 19077-2016/ISO 13320:2009, published Feb. 24, 2016.
Graphite negative electrode materials for lithium ion battery, Chinese national standard GB/T 24533-2009, published Oct. 30, 2009.
First Office Action of CN Application No. 202080081680.8, mailed Feb. 3, 2023, with Concise Explanation of Relevance.
Extended European Search Report of EP Application No. 20957153.8, mailed Mar. 30, 2023, 13 pages.
First Office Action of JP application No. 2022-545851, dated Aug. 30, 2023.
Mastersizer 3000 User Manual MAN0474 Issue 2.1 Aug. 2013, 182 pages.
Examination Report for IN application 202217036579, dated Oct. 16, 2023.
"Request for the Submission of an Opinion" for KR application No. 10-2022-7026160, dated Nov. 20, 2024.

NEGATIVE-ELECTRODE ACTIVE MATERIAL AND PREPARATION METHOD THEREOF, SECONDARY BATTERY, AND BATTERY MODULE, BATTERY PACK, AND APPARATUS CONTAINING SUCH SECONDARY BATTERY

CROSS REFERENCE TO RELATED APPLICATION

This application is a continuation of International Patent Application No. PCT/CN2020/121268, filed on Oct. 15, 2020, which is incorporated herein by reference in its entirety.

TECHNICAL FIELD

This application relates to the field of secondary battery technologies, and in particular, to a negative-electrode active material and a preparation method thereof, a secondary battery, and a battery module, a battery pack, and an apparatus that include such secondary battery.

BACKGROUND

Secondary batteries are charged and discharged through repeated intercalation and deintercalation of active ions between a positive electrode and a negative electrode, featuring outstanding features such as high energy density, long cycle life, no pollution, and no memory effect. Therefore, as clean energy, the secondary batteries have been gradually popularized from electronic products to large-scale apparatuses such as electric vehicles to adapt to sustainable development strategies of environment and energy.

However, compared with conventional oil-fueled vehicles that can be refueled quickly in a timely manner, the electric vehicles are generally charged at a smaller rate, often requiring a longer charging time. This causes range anxiety for consumers and limits rapid popularization of the electric vehicles. Therefore, in order to improve market competitiveness of the electric vehicles, it is necessary to provide secondary batteries with good fast-charging performance.

SUMMARY

This application is intended to provide a negative-electrode active material and a preparation method thereof, a secondary battery, and a battery module, a battery pack, and an apparatus that include such secondary battery, so as to improve charging performance and cycling performance of secondary batteries.

In order to achieve the foregoing invention objective, a first aspect of this application provides a negative-electrode active material, which includes a core and a coating layer covering at least part of a surface of the core, where the core includes artificial graphite, the coating layer includes amorphous carbon, a volume-based particle size distribution of the negative-electrode active material satisfies $D_v99 \leq 24$ μm, and a volume-based median particle size $D_v50$ satisfies $8$ μm$\leq D_v50 \leq 15$ μm. $D_v99$ is a particle size corresponding to a cumulative volume distribution percentage of the negative-electrode active material reaching 99%; and $D_v50$ is a particle size corresponding to a cumulative volume distribution percentage of the negative-electrode active material reaching 50%.

It is surprisingly found that when the negative-electrode active material of this application is used for a negative-electrode plate, the negative-electrode plate has higher active ion solid-phase diffusion performance. Even in a high lithium intercalation state during a later charging phase, active ions can have a relatively high diffusion rate in the negative-electrode plate to effectively reduce ohmic and concentration polarization. In this way, an overall charging speed and charging depth of the negative-electrode plate are greatly increased, significantly improving a fast-charging capability of the battery. Further, the cycling performance of the battery is also significantly improved.

In any implementation of this application, the negative-electrode active material satisfies $17$ μm$\leq D_v99 \leq 24$ μm, optionally, $18$ μm$\leq D_v99 \leq 21$ μm. The negative-electrode active material with $D_v99$ being within the foregoing range can further improve the fast-charging capability and cycling performance of the battery.

In any implementation of this application, the negative-electrode active material satisfies $9$ μm$\leq D_v50 \leq 13$ μm, optionally, $11$ μm$\leq D_v50 \leq 13$ μm. The negative-electrode active material with $D_v50$ being within an appropriate range can further improve the fast-charging capability and cycling performance of the battery.

In any implementation of this application, a particle size uniformity of the negative-electrode active material is 0.25-0.45, optionally, 0.32-0.38. The negative-electrode active material with the particle size uniformity being within the foregoing range can further improve the fast-charging capability of the battery; and further enables the negative-electrode plate to obtain a higher compacted density, thereby improving energy density of the battery.

In any implementation of this application, a particle size specific surface area of the negative-electrode active material is $0.4$ m$^2$/g-$0.75$ m$^2$/g, optionally, $0.5$ m$^2$/g-$0.65$ m$^2$/g. The negative-electrode active material with the specific surface area of particles being within the appropriate range can further improve the fast-charging performance and cycling performance of the battery and also increase an energy density of the battery.

In any implementation of this application, the negative-electrode active material includes secondary particles, and a quantity proportion of the secondary particles in the negative-electrode active material is ≥50%. Optionally, the quantity proportion of the secondary particles in the negative-electrode active material is 70%-95%. The negative-electrode active material containing an appropriate quantity of secondary particles can further improve the fast-charging capability, cycling performance, and storage performance of the battery.

In any implementation of this application, the negative-electrode active material satisfies $0.6 \geq (D_v90-D_v10)/D_v50 \leq 1.8$, optionally, $0.8 \leq (D_v90-D_v10)/D_v50 \leq 1.4$. $D_v90$ is a particle size corresponding to a cumulative volume distribution percentage of the negative-electrode active material reaching 90%; and $D_v10$ is a particle size corresponding to a cumulative volume distribution percentage of the negative-electrode active material reaching 10%. The negative-electrode active material with $(D_v90-D_v10)/D_v50$ being within an appropriate range helps further improve the fast-charging capability of the battery.

In any implementation of this application, the volume-based particle size distribution $D_v90$ of the negative-electrode active material is $13$ μm-$18$ μm, optionally, $14$ μm-$17$ μm. The negative-electrode active material with $D_v90$ being within the foregoing range can further improve the fast-charging capability of the battery.

In any implementation of this application, the volume-based particle size distribution $D_v10$ of the negative-electrode active material is 5 μm-10 μm, optionally, 6 μm-8 μm. The negative-electrode active material with $D_v10$ being within the foregoing range helps improve the cycling performance and storage performance of the battery.

In any implementation of this application, a graphitization degree of the negative-electrode active material is 91.0%-96.0%, optionally, 94.0%-95.0%. The negative-electrode active material with the graphitization degree being within the foregoing range can further improve the fast-charging capability of the battery.

In any implementation of this application, a gram capacity of the negative-electrode active material is 345 mAh/g-360 mAh/g, optionally, 350 mAh/g-358 mAh/g. The negative-electrode active material with the gram capacity being within an appropriate range can increase the energy density of the battery and further improve the fast-charging capability and cycling performance of the battery.

In any implementation of this application, a tap density of the negative-electrode active material is 0.9 g/cm³-1.3 g/cm³, optionally, 1.0 g/cm³-1.1 g/cm³. The negative-electrode active material with the tap density being within the given range can improve the fast-charging capability of the battery and also increase the energy density of the battery.

In any implementation of this application, a powder compacted density of the negative-electrode active material under a pressure of 2 kN is 1.55 g/cm³-1.67 g/cm³, optionally, 1.60 g/cm³-1.65 g/cm³. The negative-electrode active material with the powder compacted density under the pressure of 2 kN being within the given range can implement close contact between the particles of the negative-electrode film layer to form good electrolyte infiltration pore channels, thereby improving the fast-charging capability and cycling performance of the battery.

A second aspect of this application provides a preparation method for negative-electrode active material, including the following steps:

(A) providing a core, where the core includes artificial graphite; and (B) coating the core to form a coating layer on at least part of a surface of the core, so as to obtain a negative-electrode active material, where the coating layer includes amorphous carbon, and the negative-electrode active material satisfies $D_v99 \leq 24$ μm and 8 μm$\leq D_v50 \leq 15$ μm.

In any embodiment of this application, the preparation of artificial graphite described in step (A) includes:

(a) providing a coke raw material;

(b) performing shaping processing on the coke raw material to obtain a precursor;

(c) granulating the precursor to obtain a granulated product; and (d) graphitizing the granulated product to obtain artificial graphite, where a volume-based median particle size $D_v50$ of the artificial graphite is 6 μm-14 μm, and a volume-based particle size distribution $D_v99$ is 17 μm-26 μm.

In any implementation of this application, a volume-based median particle size $D_v50$ of the granulated product is 9 μm-15 μm, and a volume-based particle size distribution $D_v99$ is 17 μm-24 μm.

In any implementation of this application, a volume-based median particle size $D_v50$ of the precursor is 8 μm-13 μm, and a volume-based particle size distribution $D_v99$ is 16 μm-22 μm.

In any implementation of this application, a volume-based median particle size $D_v50$ of the coke raw material is 7 μm-12 μm, and a volume-based particle size distribution $D_v99$ is 15 μm-21 μm.

In any implementation of this application, a particle size uniformity of the precursor is denoted by $U_1$, and satisfies $0.2 \leq U_1 \leq 0.55$, optionally, $0.3 \leq U_1 \leq 0.45$.

In any implementation of this application, a particle size uniformity of the artificial graphite is denoted by $U_2$, and satisfies $0.22 \leq U_2 \leq 0.48$, optionally, $0.3 \leq U_2 \leq 0.4$.

In any implementation of this application, a volatile content of the coke raw material is denoted by $C_1$, and the particle size uniformity of the precursor is denoted by $U_1$; and a binder is added during granulation in the step (c), an amount of the binder is denoted by $C_2$, and the preparation method satisfies: $21\% \leq (C_1+C_2)/U_1 \times 100\% \leq 50\%$, optionally, $31\% \leq (C_1+C_2)/U_1 \times 100\% \leq 35\%$.

In any implementation of this application, the volatile content $C_1$ of the coke raw material satisfies $1\% \leq C_1 \leq 12\%$, optionally, $5\% \leq C_1 \leq 9\%$.

In any implementation of this application, the coke raw material includes one or more of petroleum-based non-needle coke and petroleum-based needle coke; and optionally, the coke raw material includes petroleum green coke.

In any implementation of this application, the step (B) includes: (e) coating the core with an organic carbon source and performing heat treatment to form an amorphous carbon coating layer on at least part of the surface of the core, so as to obtain the negative-electrode active material.

In any implementation of this application, an amount of the organic carbon source added in the step (e) is denoted by $C_3$; and the preparation method satisfies: $20\% \leq (C_1+C_2+C_3)/U_2 \times 100\% \leq 56\%$, and $1.2\% \leq C_3 \times$carbon residue rate$\leq 2.5\%$.

The negative-electrode active material obtained by using the preparation method of this application includes the core and the coating layer covering the surface of the core, the core includes artificial graphite, the coating layer includes amorphous carbon, and the negative-electrode active material satisfies $D_v99 \leq 24$ μm and 8 μm$\leq D_v50 \leq 15$ μm, thereby significantly improving the fast-charging capability of the battery using the negative-electrode active material. Further, the cycling performance of the battery is also significantly improved.

A third aspect of this application provides a secondary battery, which includes a negative-electrode plate, and the negative-electrode plate includes a negative-electrode current collector and a negative-electrode film layer that is provided on at least one surface of the negative-electrode current collector and that includes a negative-electrode active material, where the negative-electrode active material includes the negative-electrode active material described in this application.

The secondary battery of this application uses the negative-electrode active material described in this application, and therefore can simultaneously implement relatively high energy density, fast-charging capability, and cycling performance.

A fourth aspect of this application provides a battery module, including the secondary battery in this application.

A fifth aspect of this application provides a battery pack, including the secondary battery or the battery module in this application.

A sixth aspect of this application provides an apparatus, including at least one of the secondary battery, the battery module, or the battery pack in this application.

The battery module, the battery pack, and the apparatus in this application include the secondary battery provided in this application, and therefore have at least advantages the same as those of the secondary battery.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

DETAILED DESCRIPTION

Figure 1:
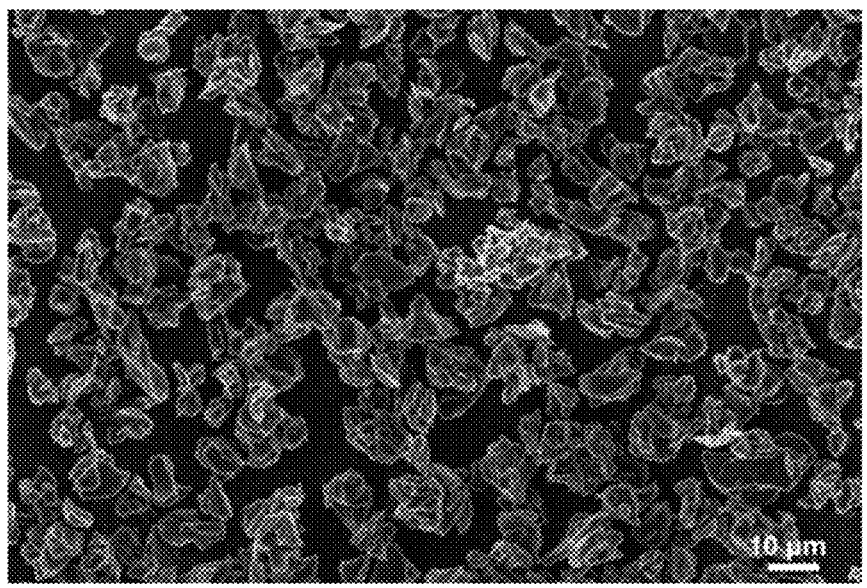
FIG. 1 is a scanning electron microscope (SEM) image of a negative-electrode active material at a magnification of 1000 times according to an embodiment of this application.

In order to make the objectives, technical solutions and beneficial technical effects of this application clearer, the following further describes this application in detail with reference to the embodiments. It should be understood that the embodiments described in this specification are merely intended to interpret this application, but not intended to limit this application.

For simplicity, only some numerical ranges are expressly disclosed in this specification. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not expressly recorded, each point or individual value between endpoints of a range is included in the range. Therefore, each point or individual value may act as its own lower limit or upper limit to be combined with any other point or individual value or combined with any other lower limit or upper limit to form a range not expressly recorded.

In the description of this specification, it should be noted that, unless otherwise stated, "above" and "below" means inclusion of the number itself, and "more" in "one or more" means at least two.

In the description of this specification, unless otherwise stated, the term "or" indicates inclusion. For example, a phrase "A or B" means "A, B, or both A and B". More specifically, any one of the following conditions satisfies the condition "A or B": A is true (or present) and B is false (or not present); A is false (or not present) and B is true (or present); or both A and B are true (or present).

The foregoing invention content of this application is not intended to describe each of the disclosed embodiments or implementations of this application. The following description illustrates exemplary embodiments in more detail by using examples. Throughout this application, guidance is provided by using a series of embodiments and the embodiments may be used in various combinations. In each instance, enumeration is only representative but should not be interpreted as exhaustive.

A secondary battery, also referred to as a rechargeable battery or a storage battery, is a battery that can be charged after being discharged to activate active materials for continuous use.

Generally, a secondary battery includes a positive-electrode plate, a negative-electrode plate, a separator, and an electrolyte. During charging and discharging of the battery, active ions (for example, lithium ions) are intercalated and deintercalated back and forth between the positive-electrode plate and the negative-electrode plate. The separator is provided between the positive-electrode plate and the negative-electrode plate, mainly plays a role of preventing short-circuits of the positive and negative electrodes, and allows ions to pass through. The electrolyte is between the positive-electrode plate and the negative-electrode plate, and mainly plays a role of conducting ions.

The inventor has found that a key to improving the fast-charging capability of the secondary battery is to improve kinetic performance of the negative electrode. The negative-electrode plate generally includes a negative-electrode current collector and a negative-electrode film layer, and the negative-electrode film layer includes a negative-electrode active material. The negative-electrode active material is usually a material that participates in intercalation and deintercalation of active ions in the negative-electrode plate during charging and discharging of the battery. At present, in order to improve kinetic performance of the battery, most methods are intended to reduce a thickness of the negative-electrode film layer or reduce a compacted density of the negative-electrode film layer. However, it has been proved through a lot of researches that in the foregoing methods for improving battery kinetics, only kinetics of the battery actually in a low SOC state (that is, in an initial charging phase) is improved to some extent while improvement on kinetics performance of the battery actually in a high SOC state (that is, in a later charging phase) is relatively slight. Therefore, the fast-charging capability of the secondary battery cannot be effectively improved. In addition, the energy density of the battery is also significantly decreased.

In the preparation process of the negative-electrode active material, the industry usually pays attention to a volume-based median particle size $D_v50$ thereof. However, because the number of particles with a cumulative volume distribution percentage of above 99% in terms of small particles is very small, $D_v99$ of the negative-electrode active material has been considered unimportant and neglected by the industry. However, the inventor has surprisingly found during in-depth research that when $D_v99$ of the negative-electrode active material is controlled within a specific range, a fast intercalation capability of the negative-electrode active material in a high lithium intercalation state (corresponding to the high SOC state of the battery) can be significantly improved. Therefore, the foregoing bottleneck can be broken, and the fast-charging capability of the secondary battery in the high SOC state can be improved.

To this end, this application provides a negative-electrode active material, which includes a core and a coating layer covering at least part of a surface of the core, where the core includes artificial graphite, the coating layer includes amorphous carbon, a volume-based particle size distribution of the negative-electrode active material satisfies $D_v99 \leq 24$ μm, and a volume-based median particle size $D_v50$ satisfies 8 μm $\leq D_v50 \leq 15$ μm.

The inventor has found through a lot of researches that, when the negative-electrode active material of this application is used, the battery can have higher active ion solid-phase diffusion performance under the premise of higher energy density. Even in the high lithium intercalation state during the later charging phase (in the high SOC state), particles of the negative-electrode active material can still maintain good electrochemical reactivity, and active ions can be quickly intercalated into bulk of the negative-electrode active material and migrate rapidly, thereby effectively improving a diffusion speed of the active ions in the negative-electrode plate and also reducing ohmic and concentration polarization. In this way, an overall charging speed and charging depth of the negative-electrode plate are greatly increased. Therefore, in this application, high-rate charging of the battery in all SOC states can be implemented, significantly improving the fast-charging capability. In addition, migration performance of active ions between the positive and negative electrodes in the battery is relatively good and features relatively low polarization, significantly improving the cycling performance. Generally, the low SOC state means being below 30% SOC, and the high SOC state means being above 60% SOC.

The artificial graphite described in this application is usually a graphite material obtained through graphitization at a high temperature, and has a relatively high graphitization and crystallization degree.

The amorphous carbon described in this application is typically a carbon material with a lower graphitization and crystallization degree.

Generally, a lattice structure of the artificial graphite tends to be a layered arrangement in a long-range ordered manner; and a lattice structure of the amorphous carbon tends to be disordered. The lattice arrangement can be usually observed by using transmission electron microscopy (TEM) images.

In some implementations, a shape of the core may be one or more of a block, a sheet, and an approximate sphere.

In some implementations, a thickness of the coating layer is $\geq 2$ nm, optionally, 2 nm-20 nm; for example, 2 nm-15 nm, 2 nm-10 nm, or 5 nm—10 nm.

In some implementations, a coverage of the coating layer on a surface of the core is $\geq 50\%$, optionally, 60%-100%.

In some implementations, the negative-electrode active material may satisfy $D_v99 \leq 23.8$ μm, $\leq 23.5$ μm, $\leq 23$ μm, $\leq 22.5$ μm, $\leq 22$ μm, $\leq 21$ μm, or $\leq 20$ μm.

In some implementations, the negative-electrode active material can satisfy $D_v99 \geq 15$ μm, $\geq 16$ μm, $\geq 17$ μm, $\geq 18$ μm, or $\geq 19$ μm.

In some implementations, the negative-electrode active material may satisfy: 15 μm $\leq D_v99 \leq 24$ μm; for example, 16 μm $\leq D_v99 \leq 22$ μm, 17 μm $\leq D_v99 \leq 24$ μm, 17 μm $\leq D_v99 \leq 23$ μm, 15 μm $\leq D_v99 \leq 21$ μm, 18 μm $\leq D_v99 \leq 21$ μm, 19 μm $\leq D_v99 \leq 21$ μm, 19 μm $\leq D_v99 \leq 22$ μm, 19 μm $\leq D_v99 \leq 23$ μm, 20 μm $\leq D_v99 \leq 22$ μm, 20 μm $\leq D_v99 \leq 21.5$ μm, or 20 μm $\geq D_v99 \leq 21$ μm.

The negative-electrode active material with $D_v99$ being within an appropriate range can further improve a solid-phase diffusion speed of active ions of the negative electrode in a high lithium intercalation state and reduce polarization. This further helps reduce relatively small particles therein, and more active ions can be intercalated into the particles. In addition, a smooth pore channel structure is formed in the negative-electrode film layer, and a liquid phase conduction path is shortened, thereby further improving the fast-charging capability and cycling performance of the battery. The negative-electrode active material with $D_v99$ being within an appropriate range enables the secondary battery to have both higher fast-charging capability and better cycling performance.

In some implementations, the negative-electrode active material can satisfy $D_v50 \leq 14$ μm, $\leq 13$ μm, or $\leq 12$ μm. Optionally, the $D_v50$ of the negative-electrode active material is $\geq 8$ μm, $\geq 9$ μm, $\geq 10$ μm, or $\geq 11$ μm. For example, the negative-electrode active material may satisfy 8 μm $\geq D_v50 \leq 14$ μm, 9 μm $\leq D_v50 \leq 13$ μm, 10 μm $\leq D_v50 \leq 14$ μm, 12 μm $\leq D_v50 \leq 14$ μm, 12 μm $\leq D_v50 \leq 13$ μm, or 11 μm $\leq D_v50 \leq 13$ μm.

The negative-electrode active material with $D_v50$ being within an appropriate range can further shorten a migration path of active ions in particles of the negative-electrode active material, and helps form a smooth pore structure in the negative-electrode film layer. In this way, the negative-electrode plate has a good solid-phase diffusion speed of active ions and good liquid-phase transmission performance, thereby further improving the fast-charging capability of the battery. In addition, with the negative-electrode active material with $D_v50$ being within an appropriate range, it can be further ensured that the negative-electrode active material has a higher gram capacity, so that the battery obtains a higher energy density and side reaction of the electrolyte in the negative electrode can be further reduced, thereby improving the cycling performance of the battery.

In some implementations, a particle size uniformity of the negative-electrode active material is 0.25-0.45, for example, may be 0.28-0.4, 0.32-0.4, 0.32-0.38, 0.30-0.36, 0.31-0.35, or 0.32-0.36. The particle size uniformity of the negative-electrode active material may characterize a dispersion degree by which the particle size of all particles of the negative-electrode active material deviates from the volume-based median particle size $D_v50$ of the negative-electrode active material, which reflects uniformity of particle size distribution of the negative-electrode active material. When the particle size uniformity of the negative-electrode active material is within the foregoing range, a relatively short liquid-phase transmission path is likely to be formed in the negative-electrode film layer, and a large contact area is present between the particles. This is good for electron conduction and active ion transmission in the negative-electrode plate, further improving the fast-charging capability of the battery. In addition, close contact between the particles of the negative-electrode film layer can be implemented, and the negative-electrode plate can have a higher compacted density, thereby improving the energy density of the battery.

In some implementations, the negative-electrode active material satisfies: $0.6 \leq (D_v90-D_v10)/D_v50 \leq 1.8$. For example, $(D_v90-D_v10)/D_v50$ of the negative-electrode active material is 0.8 to 1.4, 0.9 to 1.3, 1.0 to 1.25, or 1.2 to 1.6. $(D_v90-D_v10)/D_v50$ of the negative-electrode active material reflects a degree by which the particle size of larger particles and the particle size of smaller particles deviate from the volume-based median particle size $D_v50$ in the negative-electrode active material. The negative-electrode active material with $(D_v90-D_v10)/D_v50$ being within an appropriate range helps improve processing performance of a negative-electrode slurry and the negative-electrode film layer, so that the negative-electrode film layer has relatively high particle distribution uniformity. In this way, different areas of the negative-electrode film layer all exhibit relatively high active ion transmission performance, and the fast-charging capability of the battery is further improved.

In some implementations, the volume-based particle size distribution $D_v90$ of the negative-electrode active material is 13 μm-18 μm, for example, may be 13 μm-16 μm, 14 μm-17 μm, or 15 μm-18 μm. The negative-electrode active material with $D_v90$ being within an appropriate range can further improve the solid-phase diffusion speed of active ions in the negative-electrode film layer, thereby further improving the fast-charging capability of the battery. In addition, the negative-electrode active material can further have a relatively high gram capacity, which helps increase the energy density of the battery.

In some implementations, the volume-based particle size distribution $D_v10$ of the negative-electrode active material is 5 μm-10 μm, for example, may be 6 μm-8 μm. The content of small particles in the negative-electrode active material is small, which can reduce side reaction between the electrolyte and the material, and improve the cycling performance and storage performance of the battery.

In some implementations, a particle size specific surface area of the negative-electrode active material is 0.4 m²/g-0.75 m²/g, for example, may be 0.4 m²/g-0.7 m²/g, 0.42 m²/g-0.68 m²/g, 0.46 m²/g-0.55 m²/g, 0.5 m²/g-0.68 m²/g, or 0.5 m²/g-0.65 m²/g.

It should be noted that the "particle size specific surface area" of the negative-electrode active material of this application is not the same as a conventional "specific surface area" of the negative-electrode active material. At present, the specific surface area (SSA) of the negative-electrode active material in the industry is mostly obtained by using a gas adsorption BET method, and is merely used to characterize a physical adsorption specific surface area of the negative-electrode active material. The "particle size specific surface area" of the negative-electrode active material in this application is obtained by using a laser diffraction particle size analysis method, and may be used to characterize a degree by which a profile of the negative-electrode active material deviates from a sphere.

The inventor has found that the negative-electrode active material with the particle size specific surface area being within an appropriate range can increase ion deintercalation channels in the negative-electrode film layer and reduce a charge exchange resistance, and enables the negative-electrode film layer to form smoother pore channels, so as to improve wettability of the electrolyte. This further improves a solid-phase and liquid-phase transmission speed of active ions in the negative-electrode plate, and further improves the fast charging performance and cycling performance of the battery. In addition, the negative-electrode active material with the particle size specific surface area being within an appropriate range can also improve the compacted density of the negative-electrode film layer, thereby increasing the energy density of the battery.

Figure 2:
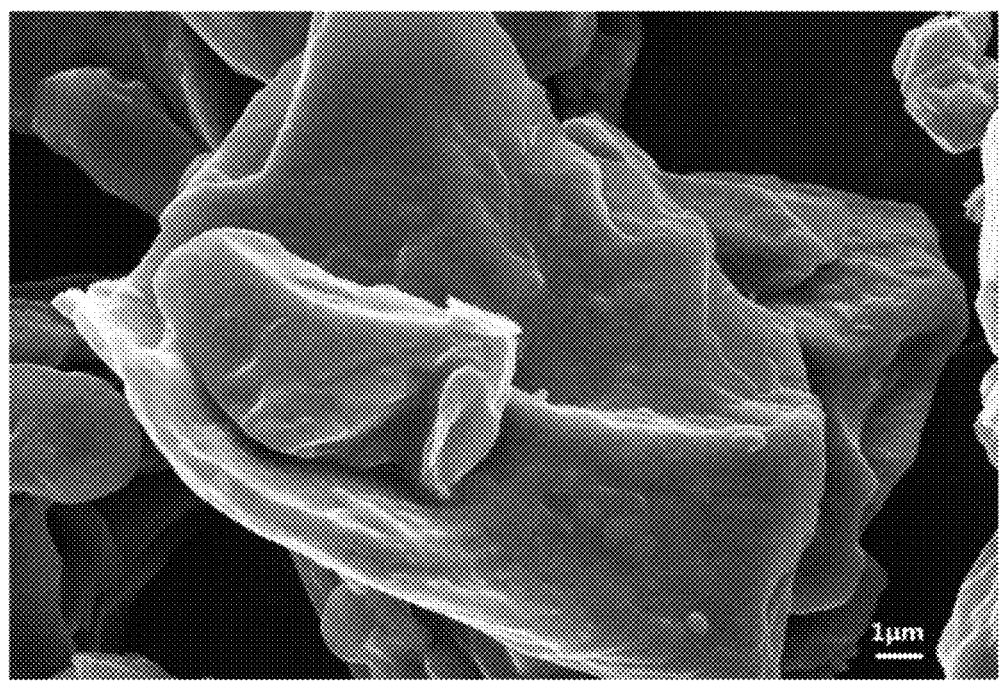
FIG. 2 is a scanning electron microscope (SEM) image of a negative-electrode active material at a magnification of 5000 times according to another embodiment of this application.

In some implementations, as shown in FIG. 1 and FIG. 2, secondary particles are included in the negative-electrode active material. Optionally, the quantity proportion of the secondary particles in the negative-electrode active material is ≥50%. For example, the quantity proportion of the secondary particles in the negative-electrode active material is 50%-100%, 60%-100%, 60%-90%, 70%-100%, 70%-95%, 70%-90%, 70%-80%, or 75%-85%. When the negative-electrode active material contains a large quantity of secondary particles, the active-ion deintercalation channels in the negative-electrode film layer increase, thereby further improving the fast-charging capability of the battery, reducing polarization, and improving the cycling performance. In particular, when the negative-electrode active material includes both secondary particles and primary particles, side reactions of the electrolyte in the negative electrode can be reduced, and the cycling performance and storage performance of the battery can be further improved.

In some implementations, the graphitization degree of the negative-electrode active material is 91.0%-96.0%, for example, may be 94.0%-95.0%, or 93.0%-94.5%. The negative-electrode active material with the graphitization degree being within the foregoing range can have a larger interlayer spacing in the particle structure, and has a lower powder resistance, further improving the fast-charging capability.

In some implementations, the gram capacity of the negative-electrode active material is 345 mAh/g-360 mAh/g, for example, may be 350 mAh/g-358 mAh/g, 351 mAh/g-356 mAh/g, or 352 mAh/g-355 mAh/g. The negative-electrode active material with a higher gram capacity can increase the energy density of the battery. The gram capacity of the negative-electrode active material being within the foregoing range means that the active-ion migration path of the material is short. This can improve the fast-charging capability of the battery.

In some implementations, a tap density of the negative-electrode active material is 0.9 g/cm³-1.3 g/cm³, for example, may be 1.0 g/cm³-1.1 g/cm³. The negative-electrode active material with the tap density being within the given range can make the particles of the negative-electrode film layer be in good contact, improving the fast-charging capability of the battery. In addition, the particles are tightly packed, which can further increase the energy density of the battery.

In some implementations, a powder compacted density of the negative-electrode active material under 2 kN pressure is 1.55 g/cm³-1.67 g/cm³; and for example, may be 1.60 g/cm³-1.65 g/cm³. The negative-electrode active material with the powder compacted density under the pressure of 2 kN being within the given range can implement close contact between the particles of the negative-electrode film layer to form good electrolyte infiltration pore channels, thereby improving the fast-charging capability and cycling performance of the battery.

In this application, $D_v99$, $D_v90$, $D_v50$, $D_v10$, the particle size uniformity, and the particle size specific surface area of the negative-electrode active material can be measured by using the laser diffraction particle size analysis method. For example, referring to the standard GB/T 19077-2016, a laser particle size analyzer (for example, Malvern Master Size 3000) is used for measurement.

$D_v99$ is a particle size corresponding to a cumulative volume distribution percentage of the negative-electrode active material reaching 99%; $D_v90$ is a particle size corresponding to a cumulative volume distribution percentage of the negative-electrode active material reaching 90%; $D_v50$ is a particle size corresponding to a cumulative volume distribution percentage of the negative-electrode active material reaching 50%; and $D_v10$ is a particle size corresponding to a cumulative volume distribution percentage of the negative-electrode active material reaching 10%.

Figure 3:
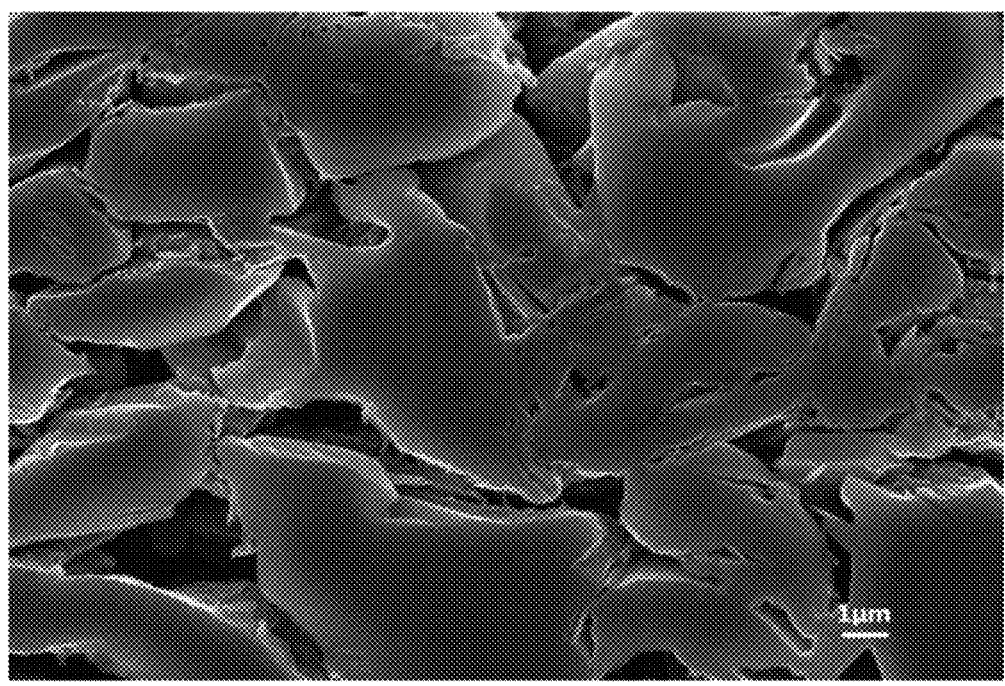
FIG. 3 is an ion polishing cross-sectional topography (CP) image of a negative-electrode plate at a magnification of 5000 times after a negative-electrode active material of this application is made into the negative-electrode plate.

In this application, the negative-electrode active material can be made into a negative-electrode plate, and an ion polishing cross-section topography (CP) test is conducted on the negative-electrode plate to observe a material type of the core. As an example, the test method may be as follows: cutting a prepared negative-electrode plate into a to-be-tested sample of a specific size (for example, 2 cm×2 cm), and fastening the negative-electrode plate to a sample stage by using paraffin; placing the sample stage in a sample holder and locking the sample holder firmly, turning on an argon ion cross-section polisher (for example, IB-19500CP) and performing evacuation (for example, $10^{-4}$ Pa), setting argon flow (for example, 0.15 MPa), voltage (for example, 8 KV), and polishing time (for example, 2 hours), and then adjusting the sample stage to rocking mode to start polishing. For the sample test, refer to JY/T010-1996. A region of the to-be-tested sample may be randomly selected for scanning and testing, and an ion polishing cross-sectional topography (CP) image of the negative-electrode plate is obtained at a magnification (for example, 5000 times). For example, it can be seen from FIG. 3 of this application that the core of the negative-electrode active material of this application is artificial graphite.

Figure 4:
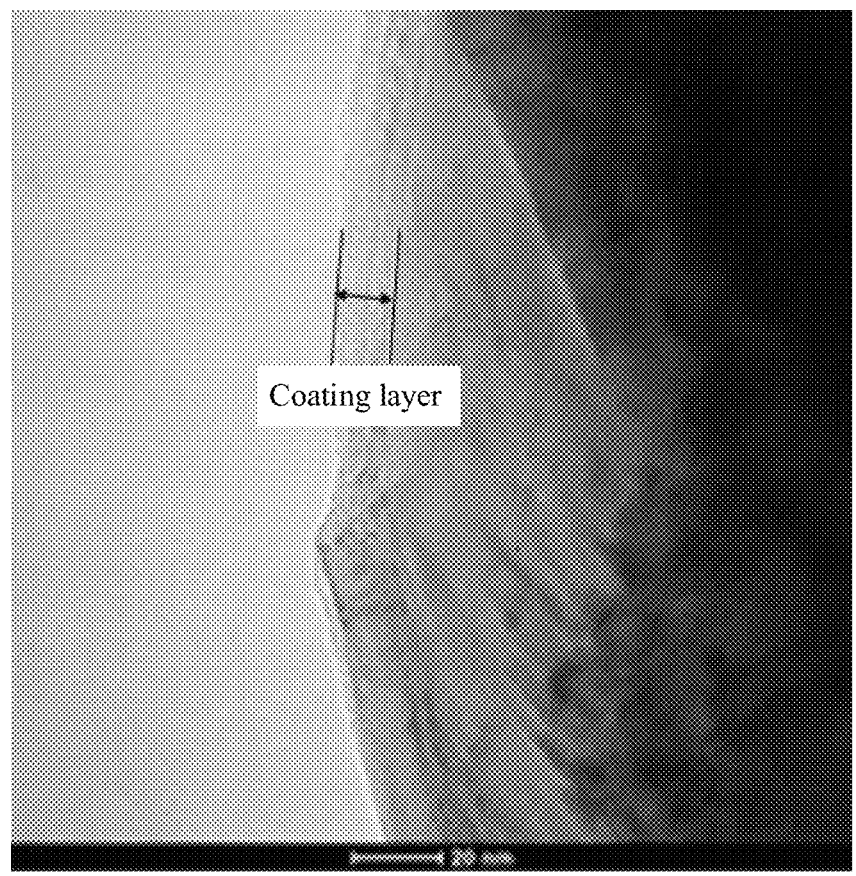
FIG. 4 is a transmission electron microscope (TEM) image of a negative-electrode active material at a magnification of 60000 times according to an embodiment of this application.

In this application, the structure of the negative-electrode active material (for example, the core and the coating layer) can be tested by using a device and method known in the art. As an example, the following steps may be performed: selecting a microgrid with a specific diameter (for example, 3 mm in diameter), holding an edge of the microgrid with pointed tweezers, placing a membrane surface of the microgrid upward (to observe a shiny side, namely the membrane surface, under light), and gently placing it flat on white filter paper; adding an appropriate amount of graphite particle sample (for example, 1 g) to a beaker containing an appropriate amount of ethanol, and performing ultrasonic vibration for 10 min to 30 min; sucking with a glass capillary and adding 2-3 drops of the to-be-tested sample on the microgrid; and after baking in the oven for 5 min, placing the microgrid with the to-be-tested sample on the sample stage, and conducting testing at a specific magnification (for example, 60,000 times) by using a transmission electron microscope (for example, Hitachi HF-3300S Cs-corrected STEM), so as to obtain a transmission electron microscope (TEM) image of the to-be-tested sample. For example, it can be seen from FIG. 4 of this application that the negative-electrode active material of this application includes the core and the coating layer.

In this application, the primary particle and secondary particle have meanings known in the art. The primary particle is a non-agglomerated particle, and the secondary particle is an agglomerated particle formed through aggregation of two or more primary particles. The primary particles and secondary particles can be easily distinguished with SEM images photographed by using a scanning electron microscope.

The quantity proportion of the secondary particles in the negative-electrode active material can be measured by using a method known in the art. An example test method is as follows: placing the negative-electrode active material flat and attaching it onto a conductive adhesive to obtain a to-be-tested sample 6 cm long and 1.1 cm wide; and conducting testing on the morphology of the particles by using a scanning electron microscope (for example, ZEISS Sigma 300). For testing, refer to JY/T010-1996. In order to ensure accuracy of test results, a plurality (for example, 5) of different regions of the to-be-tested sample may be randomly selected for scanning and testing, and a quantity proportion of the secondary particles in each region in the total number of particles is obtained through calculation at a magnification (for example, 1000 times), which is a quantity proportion of the secondary particles in the area. An average value of test results of the plurality of test regions is used as the quantity proportion of the secondary particles in the negative-electrode active material. In order to ensure accuracy of the test results, a plurality (for example, 10) of test samples may be used to repeat the foregoing test, and an average value of test results of all the test samples is used as the final test result.

The graphitization degree of the negative-electrode active material has a meaning known in the art, and can be tested by using a method known in the art. For example, an X-ray diffractometer (for example, Bruker D8 Discover) may be used. For testing, refer to JIS K 0131-1996 and JB/T 4220-2011. A size of $d_{002}$ is measured and then the graphitization degree is calculated according to a formula $G=(0.344-d_{002})/(0.344-0.3354)\times100\%$, where $d_{002}$ is an interlayer spacing of the graphite crystal structure in nanometers (nm). In the X-ray diffraction analysis test, a copper target may be used as an anode target, CuKα rays are used as a radiation source, with a ray wavelength $\lambda=1.5418$ Å and a scanning 2θ angle range of 20°-80°, and a scanning rate may be 4°/min.

The tap density of the negative-electrode active material has a meaning known in the art, and can be tested by using a method known in the art. For example, reference may be made to the standard GB/T 5162-2006, and a powder tap density tester may be used for testing. For example, the FZS4-4B type tap density meter manufactured by Beijing Iron and Steel Research Institute is used, and test parameters are as follows: vibration frequency: 250±15 times/min, amplitude: 3±0.2 mm, vibration frequency: 5000 times, and measuring cylinder: 25 mL.

The powder compacted density of the negative-electrode active material under a pressure of 2 kN has a meaning known in the art, and can be tested by using a method known in the art. For example, reference is made to the standard GB/T24533-2009, and an electronic pressure testing machine (for example, UTM7305) is used for testing. An example test method is as follows: weighing and adding 1 g of the negative-electrode active material to a mold with a bottom area of 1.327 cm², applying pressure to 200 kg (equivalent to 2 kN) and holding the pressure for 30 s, releasing the pressure and waiting for 10 s, and then recording and calculating the powder compacted density of the negative-electrode active material under the 2 kN pressure.

The gram capacity of the negative-electrode active material has a meaning known in the art, and can be tested by using a method known in the art. An example test method is as follows: mixing the prepared negative-electrode active material, a conductive agent carbon black (Super P), and a binder polyvinylidene fluoride (PVDF) in a mass ratio of 91.6:1.8:6.6 evenly in a solvent N-methylpyrrolidone (NMP) to obtain a slurry, applying the prepared slurry on a copper foil current collector, and drying it in an oven for later use. A metal lithium sheet is used as a counter electrode, and a polyethylene (PE) film is used as the separator. Ethylene carbonate (EC), ethyl methyl carbonate (EMC), and diethyl carbonate (DEC) are mixed at a volume ratio of 1:1:1, and then $LiPF_6$ was uniformly dissolved in the foregoing solution to obtain an electrolyte, where the concentration of $LiPF_6$ is 1 mol/L. A CR2430 coin battery is assembled in an argon gas-protected glove box. After being left standing for 12 hours, the obtained coin battery is discharged to 0.005V at a constant current of 0.05 C at 25° C. and left standing for 10 minutes; discharged to 0.005V at a constant current of 50 μA, left standing for 10 minutes, and discharged to 0.005V at a constant current of 10 μA; and then charged to 2V at a constant current of 0.1 C. A-charging capability is recorded. A ratio of the-charging capability to the mass of the negative-electrode active material is the gram capacity of the prepared negative-electrode active material.

It should be noted that, for testing of the foregoing parameters of the negative-electrode active material, a negative-electrode active material sample may be directly used for testing, or a sample for testing may be obtained from the secondary battery.

In a case that the foregoing testing samples are fetched from the secondary battery, as an example, a sample may be obtained by performing the following steps:

(1) discharging the secondary battery (for sake of safety, generally making the battery in fully discharged state), disassembling the battery, and taking out the negative-electrode plate, using dimethyl carbonate (DMC) to soak the negative-electrode plate for a specific time (for example, 2-10 hours); and then taking out the negative-electrode plate and drying it at a given temperature for a specific time (for example, 60° C., 4 h), and taking out the negative-electrode plate obtained after drying;

(2) baking, at a given temperature for a specific time (for example, 400° C., 2 h), the negative-electrode plate obtained after drying in step (1), randomly selecting a region from the negative-electrode plate obtained after baking, and obtaining a negative-electrode active material sample (the sample may be obtained by scraping powder using a blade); and (3) sieving the negative-electrode active material collected in step (2) (for example sieving with a 200-mesh screen), to finally obtain the negative-electrode active material sample that can be used for testing the foregoing material parameters of this application.

This application provides a preparation method of the negative-electrode active material below, and the negative-electrode active material can be obtained by using the preparation method. The preparation method of the negative-electrode active material may include the following steps (A) and (B).

(A) providing a core, where the core includes artificial graphite; and (B) coating the core to form a coating layer on at least part of a surface of the core, so as to obtain a negative-electrode active material, where the coating layer includes amorphous carbon, and the negative-electrode active material satisfies $D_v 99 \leq 24$ μm and $8$ μm$\leq D_v 50 \leq 15$ μm.

In some implementations, in step (A), the preparation method of artificial graphite may include steps (a) to (d).

(a) providing a coke raw material;

(b) performing shaping processing on the coke raw material to obtain a precursor;

(c) granulating the precursor to obtain a granulated product; and (d) graphitizing the granulated product to obtain artificial graphite, where a volume-based median particle size $D_v 50$ of the artificial graphite is 6 μm-14 μm, and a volume-based particle size distribution $D_v 99$ is 17 μm-26 μm.

In some implementations, $D_v 50$ and $D_v 99$ of the coke raw material can be adjusted, so that $D_v 50$ of the coke raw material is 7 μm-12 μm, and $D_v 99$ is 15 μm-21 μm. The coke raw material with $D_v 50$ and $D_v 99$ being within the given ranges helps improve subsequent shaping and granulation processes, so that the final negative-electrode active material has an appropriate secondary particle content and appropriate $D_v 50$ and $D_v 99$. Optionally, $D_v 50$ of the coke raw material is 8 μm-12 μm, 8 μm-11.5 μm, or 9 μm-11 μm. Optionally, $D_v 99$ of the coke raw material is 16 μm-21 μm, 17 μm-21 μm, 17 μm-20 μm, or 17 μm-19 μm.

In step (a), the coke raw material can be directly obtained commercially, or be obtained by pulverizing the coke material. In some implementations, the coke material may be pulverized to control $D_v 50$ and $D_v 99$ of the coke raw material within desired ranges. The coke material may be pulverized by using a device and method known in the art, for example, through jet milling, mechanical milling, or roller milling. A large quantity of extremely small particles are usually generated during pulverization, and sometimes there are also extremely large particles. Therefore, after pulverization, classification may be performed according to requirements, so as to remove extremely small particles and extremely large particles from the pulverized powder. The coke raw material with desired particle size distribution can be obtained after classification. Classification may be performed by using a device and method known in the art, for example, a classification screen, a gravity classifier, or a centrifugal classifier.

Pulverization of the coke material may be performed at a process step including a pulverizer, a classifier and an induced draft fan. During pulverization, $D_v 50$ and $D_v 99$ of the obtained coke raw materials can be controlled within desired ranges by adjusting feeding frequency, pulverizing frequency, classification frequency, and induced drafting frequency. Compared with relatively low classification frequency in the conventional pulverization process, the method in this application can increase the classification frequency, which helps remove excessively small particles. Compared with relatively high induced drafting frequency in the conventional pulverization process, the method in this application can increase the induced drafting frequency, which helps remove excessively large particles. In addition, compared with the conventional pulverization process that controls the frequency within a larger range, the method in this application can also control frequency of the main engine, classification frequency, and induced drafting frequency within a smaller frequency range, thereby reducing particle size distribution of the coke raw material. For example, $D_{50}$ and $D_v 99$ of the coke raw material are controlled within smaller ranges. The feeding frequency can also be adjusted to control a feeding amount, further improving pulverization effects of the material.

In some implementations, the feeding frequency may be 10 Hz-40 Hz, for example, 25 Hz-35 Hz.

In some implementations, the pulverization frequency may be 20 Hz-50 Hz, for example, 35 Hz-45 Hz.

In some implementations, the classification frequency may be 20 Hz-50 Hz, for example, 40 Hz-50 Hz.

In some implementations, the induced drafting frequency may be 30 Hz-55 Hz, for example, 35 Hz-45 Hz.

Those skilled in the art may choose to adjust one or more of the foregoing process conditions according to actual operation conditions, and finally obtain the coke raw material with $D_v 50$ of 7 μm-12 μm and $D_v 99$ of 15 μm-21 μm.

In some implementations, the coke raw material in step (a) includes one or more of petroleum-based non-needle coke and petroleum-based needle coke. Optionally, the coke raw material includes petroleum green coke.

In some implementations, the volatile content $C_1$ of the coke raw material in step (a) satisfies $1\% \leq C_1 \leq 12\%$. Optionally, the volatile content $C_1$ of the coke raw material is 3%-10%, 5%-9%, 6%-8%, 7%-8.5%, 7.5%-8.5%, or the like. The coke raw material with the volatile content being within an appropriate range helps improve the particle size distribution of the material in the subsequent granulation process, so that the negative-electrode active material has desired particle size distribution. In addition, the coke raw material with the volatile content being within an appropriate range can also make the prepared artificial graphite have higher structural strength, and increase the cycle life of the negative-electrode active material, thereby improving the cycling performance of the battery.

The volatile content of the coke raw material can be tested by using a method known in the art. For example, refer to SH/T 0026-1990 for testing.

In step (b), edges and corners of particles of the coke raw material can be polished through shaping, which is conducive to the subsequent granulation process, so that the secondary particles in the resulting negative-electrode active material have higher structural stability. Shaping treatment on the coke raw material may be performed by using a device and method known in the art, such as a shaping machine or other shaping devices.

In some implementations, after shaping treatment of the coke raw material, classification is further performed, so that the precursor has $D_v50$ of 8 μm-13 μm and $D_{99}$ of 16 μm-22 μm. In this way, the negative-electrode active material obtained finally has an appropriate content of the secondary particles and has appropriate $D_v50$ and $D_v99$. Optionally, $D_v50$ of the precursor is 9 μm-12 μm, 9 μm-11 μm, 10 μm-12 μm, or 10 μm-11 μm. $D_v99$ of the precursor is 17 μm-22 μm, 18 μm-21 μm, or 18 μm-20 μm. Classification may be performed by using a device and method known in the art, for example, a classification screen, a gravity classifier, or a centrifugal classifier.

Shaping and classification can be performed at a process step including a shaping machine, a classification machine, and an induced draft fan. During shaping and classification, $D_v50$ and $D_v99$ of the obtained precursor can be controlled within a required range by adjusting shaping frequency (for example, main-machine frequency and auxiliary-machine frequency of the shaping machine), classification frequency, and induced drafting frequency. The inventor has found that, compared with a conventional shaping and classification process, the method of this application improves the shaping frequency during processing, appropriately prolongs a shaping time, and also reduces the classification frequency and induced drafting frequency during processing, so that $D_v50$ and $D_v99$ of the obtained precursor are controlled within a target range.

The obtained precursor may also have an appropriate particle size uniformity ($U_1$), which helps improve the particle size uniformity of the obtained negative-electrode active material.

In some implementations, the particle size uniformity $U_1$ of the precursor satisfies $0.2 \leq U_1 \leq 0.55$, for example, $0.2 \leq U_1 \leq 0.5$, $0.25 \leq U_1 \leq 0.45$, $0.3 \leq U_1 \leq 0.45$, $0.3 \leq U_1 \leq 0.4$, $0.35 \leq U_1 \leq 0.55$, or $0.35 \leq U_1 \leq 0.45$.

In some implementations, in step (b), shaping and classification are performed on the coke raw material based on the following values of the shaping machine: a main-machine frequency of 35 Hz-40 Hz, an auxiliary-machine frequency of 60 Hz-70 Hz, a classification frequency of 40 Hz-50 Hz, an induced drafting frequency of 10 Hz-25 Hz, and a shaping time of 160-180 s, so as to obtain the precursor with $D_v50$ of 8 μm-13 μm and $D_v99$ of 16 μm-22 μm.

In step (c), the precursor is granulated to form secondary particles by agglomerating independently dispersed primary particles. As a result, isotropy of the artificial graphite is improved, and active ions can be intercalated into the particles from all directions, thereby improving a solid-phase lithium intercalation rate and reducing polarization.

In some implementations, $D_v50$ of the granulated product obtained in step (c) may be 9 μm-15 μm, and $D_v99$ is 17 μm-24 μm. Optionally, $D_v50$ of the granulated product is 10 μm-14 μm, 11 μm-15 μm, or 11 μm-13 μm. Optionally, $D_v99$ of the granulated product is 18 μm-24 μm, or 19 μm-22 μm.

The granulated product with $D_v50$ and $D_v99$ being within appropriate ranges makes $D_v50$ and $D_v99$ of the finally obtained negative-electrode active material fall within a desired ranges.

Granulation may be performed in step (c) by using a device known in the art, for example, a granulator. The granulator usually includes an agitating reactor and a temperature control module for the reactor. The granulation degree can be adjusted by adjusting a stirring speed, heating rate, granulation temperature, cooling rate, and the like in the granulation process, and $D_v50$ and $D_v99$ of the resulting granulated product can also be controlled within the desired ranges. Further, through adjustment in the foregoing granulation process, $D_v10$ and $D_v90$ of the resulting granulated product can also be controlled within the required ranges, so that $D_v10$ and $D_v90$ of the finally obtained negative-electrode active material can meet the requirements.

In some implementations, the precursor can be mixed with a binder, and then granulated at a high temperature. A mixing temperature may be 20° C. to 40° C. Compared with a preparation process of conventional graphite, this application appropriately increases mixing frequency and shortens a mixing time, thereby improving the granulation degree and helping control $D_v50$ and $D_v99$ of the resulting granulated product within required ranges.

A temperature for high-temperature granulation may be determined based on a type of the binder. The binder is softened at a high temperature to bond particles, implementing granulation. In some implementations, the binder is asphalt. In these embodiments, the granulation temperature may range from 700° C. to 800° C. This application further improves a heating program of the high-temperature granulation process, and uses stepwise heating. A plurality (for example, 2 to 4) of programmed heating platforms are set in the heating process, so that the granulated product can obtain the desired particle size distribution. In addition, the particle size uniformity of the granulated product is relatively good, so that the subsequent artificial graphite and the final negative-electrode active material product can obtain a better particle size uniformity.

In some implementations, in step (c), the mixing frequency can be controlled to be 35 Hz-38 Hz, and the mixing time is 50 min-65 min. The temperature is increased to 300° C.-400° C. at 6-10° C./min and maintained at the temperature for 1 h-2 h; increased to 500° C.-600° C. at 6-10° C./min and maintained at the temperature for 1 h-2 h; increased to 700° C.-800° C. at 6-10° C./min and maintained at the temperature for 1 h-2 h; and then is naturally cooled, so as to obtain a granulated product.

In some implementations, in step (c), an amount $C_2$ of the binder that is added during granulation, the volatile content $C_1$ of the coke raw material, and the particle size uniformity $U_1$ of the precursor satisfy: $21\% \leq (C_1+C_2)/U_1 \times 100\% \leq 50\%$. Optionally, $25\% \leq (C_1+C_2)/U_1 \times 100\% \leq 45\%$, $25\% \leq (C_1+C_2)/U_1 \times 100\% \leq 38\%$, $27\% \leq (C_1+C_2)/U_1 \times 100\% \leq 38\%$, $30\% \leq (C_1+C_2)/U_1 \times 100\% \leq 40\%$, or $31\% \leq (C_1+C_2)/U_1 \times 100\% \leq 35\%$. When the amount $C_2$ of the binder that is added during granulation, the volatile content $C_1$ of the coke raw material, and the particle size uniformity $U_1$ of the precursor satisfy the foregoing relationship, the granulation degree of particles of the negative-electrode active material can be improved, and the ion deintercalation performance and structural stability of the negative-electrode active material can be improved.

The amount $C_2$ of the binder added during granulation is a percentage of the weight of the binder added during granulation in the total weight of the precursor. The granulation process is performed under a condition with the binder added or not added.

In some implementations, the amount of the binder $C_2$ added during granulation may satisfy $0\% \leq C_2 \leq 16\%$, optionally, $1\% \leq C_2 \leq 12\%$, $2\% \leq C_2 \leq 10\%$, $4\% \leq C_2 \leq 7\%$, or $5\% \leq C_2 \leq 9\%$.

In some implementations, in step (d), graphitization is performed on the granulated product at a temperature of 2800° C. to 3200° C., so as to obtain artificial graphite with an appropriate graphitization degree. Optionally, the temperature for graphitization may be 2900° C. to 3100° C.

In step (d), graphitization may be performed by using a device known in the art, for example, a graphitization furnace, and further for example, an Acheson graphitization furnace. After graphitization is completed, a small quantity of extremely large particles formed by agglomeration in the high-temperature graphitization process may be removed from the granulated product through sieving, so that $D_v50$ and $D_v99$ of the final negative-electrode active material fall within the required ranges.

In some implementations, $D_v50$ of the artificial graphite obtained in step (d) may be 6.5 μm-14 μm, 7 μm-14 μm, 6 μm-13 μm, 7 μm-13.5 μm, 8 μm-12 μm, 9 μm-12 μm, 9 μm-11 μm, 10 μm-13 μm, 10 μm-12 μm, 6.5 μm-12 μm, or 6.5 μm-12.5 μm.

In some implementations, $D_v99$ of the artificial graphite obtained in step (d) may be 18 μm-24 μm, 19 μm-26 μm, 21 μm-26 μm, 20 μm-25 μm, 20 μm-23 μm, or 19.5 μm-22 μm.

In some implementations, the particle size uniformity $U_2$ of the artificial graphite obtained in step (d) may satisfy $0.22 \leq U_2 \leq 0.48$, optionally, $0.25 \leq U_2 \leq 0.45$, $0.26 \leq U_2 \leq 0.43$, $0.3 \leq U_2 \leq 0.4$, or $0.33 \leq U_2 \leq 0.38$. The obtained artificial graphite with the particle size uniformity being within an appropriate range helps make the particle size uniformity of the finally obtained negative-electrode active material be within a desired range.

In some implementations, the step (B) may include: (e) coating the core with an organic carbon source and performing heat treatment to form an amorphous carbon coating layer on at least part of the surface of the core, so as to obtain the negative-electrode active material.

In some implementations, in step (e), after an amorphous carbon coating layer is formed on at least part of the surface of the core, sieving is performed to obtain the negative-electrode active material.

As an example, the artificial graphite obtained in step (d) may be mixed with the organic carbon source, so that the organic carbon source coats at least part of a surface of the artificial graphite. Heating treatment is then performed at a temperature of 700° C. to 1800° C. to carbonize the organic carbon source, so as to form an amorphous carbon coating layer on at least part of the surface of the artificial graphite. Optionally, the temperature of heating treatment is 1000° C. to 1300° C.

In some implementations, an amount $C_3$ of the organic carbon source that is added in the coating process, a volatile content $C_1$ of the coke raw material, an amount $C_2$ of the binder, and a particle size uniformity $U_2$ of the artificial graphite satisfy: $20\% \leq (C_1+C_2+C_3)/U_2 \times 100\% \leq 56\%$. The organic carbon source satisfies $1.2\% \leq C_3 \times$ carbon residue rate$\leq 2.5\%$. The amount $C_3$ of the organic carbon source is a percentage of a weight of the organic carbon source added in the coating process in the total weight of the artificial graphite. The carbon residue rate is a carbon residue rate of the organic carbon source, which can be measured by using an LP-5731 coal pitch coking value tester. For the testing, refer to GB/T268 "Test Method for Carbon Residues in Petroleum Products", and GB/T8727-2008 "Test Method for Coking Values of Coal Pitch Products".

The amount of the organic carbon source added in the coating process satisfying the foregoing relationship can improve the granulation degree of the negative-electrode active material, so that the particle size uniformity of negative-electrode active material, the particle size specific surface area, and a quantity proportion of the secondary particles fall within the foregoing ranges. In addition, when the amount of the organic carbon source falls within the foregoing range, and the coating layer has an appropriate proportion in the negative-electrode active material, the negative-electrode active material can have both good kinetic performance and long cycle life. Optionally, $30\% \leq (C_1+C_2+C_3)/U_2 \times 100\% \leq 48\%$. Further optionally, $40\% \leq (C_1+C_2+C_3)/U_2 \times 100\% \leq 48\%$. Optionally, $1.5\% \leq C_3 \times$carbon residue rate$\leq 2.4\%$, $1.8\% \leq C_3 \times$carbon residue rate$\leq 2.3\%$, or $2\% \leq C_3 \times$ carbon residue rate$\leq 2.2\%$.

Optionally, $2\% \leq C3 \leq 8\%$. For example, $C_3$ may be 3%, 4%, 5%, 6%, or 7%.

In some implementations, the organic carbon source may be selected from one or more of pitch (for example, coal pitch or petroleum pitch), phenolic resin, coconut shell, and the like, and further optionally, is pitch.

In the foregoing preparation process, the coke raw material usually contains some impurity elements (for example, iron, nickel, chromium, zinc, sulfur, or silicon), and some impurity elements (such as iron or copper) may also be introduced by devices used during pulverization, shaping, the granulation. In normal cases, content of the impurity elements in the core is small, generally less than 1 ppm.

In the foregoing preparation process, the organic carbon source used in the coating process and the device used for coating may introduce a trace amount of impurity elements in the coating layer.

Secondary Battery

This application further provides a secondary battery. The secondary battery includes a positive-electrode plate, a negative-electrode plate, and an electrolyte. During charging and discharging of the battery, active ions are intercalated and deintercalated back and forth between the positive-electrode plate and the negative-electrode plate. The electrolyte is between the positive-electrode plate and the negative-electrode plate, and plays a role of conducting ions.

[Negative-Electrode Plate]

In the secondary battery of this application, the negative-electrode plate includes a negative-electrode current collector and a negative-electrode film layer provided on at least one surface of the negative-electrode current collector, where the negative-electrode film layer includes any one or more of the negative-electrode active materials in this application.

In some implementations, optionally, in addition to the foregoing negative-electrode active material of this application, the negative-electrode film layer may further include a specific quantity of other commonly used negative-electrode active materials, for example, one or more of natural graphite, other artificial graphite, soft carbon, hard carbon, silicon-based materials, tin-based materials, and lithium titanate. The silicon-based material may be selected from one or more of elemental silicon, silicon oxide, and silicon-carbon composite. The tin-based material may be selected from one or more of elemental tin, tin-oxygen compound, and tin alloy.

In the secondary battery of this application, the negative-electrode film layer usually includes the negative-electrode active material and optionally a binder, optionally a conductive agent, and other optional auxiliary agents, and is usually obtained through drying after a negative-electrode slurry is applied. The negative-electrode slurry is usually obtained by dispersing the negative-electrode active material and optionally a conductive agent, a binder, or the like in a solvent and stirring uniformly. The solvent may be N-methylpyrrolidone (NMP) or deionized water.

As an example, the conductive agent is one or more of superconducting carbon, carbon black (for example, acetylene black or Ketjen black), carbon dots, carbon nanotube, graphene, and carbon nanofiber.

As an example, the binder may include one or more of styrene-butadiene rubber (SBR), water-soluble unsaturated resin SR-1B, water-based acrylic resin, polyvinyl alcohol (PVA), sodium alginate (SA), and carboxymethyl chitosan (CMCS).

Other optional auxiliary agents are, for example, a thickener (for example, sodium carboxymethyl cellulose CMC-Na) or a PTC thermistor material.

In addition, in the secondary battery of this application, the negative-electrode plate does not exclude additional functional layers other than the negative-electrode film layer. For example, in some implementations, the negative-electrode plate of this application may further include a conductive primer layer (which is, for example, formed by a conductive agent and a binder) sandwiched between the negative-electrode current collector and the first negative-electrode film layer and disposed on the surface of the negative-electrode current collector. In some other implementations, the negative-electrode plate of this application may further include a protective layer covering a surface of a second negative-electrode film layer.

[Positive-Electrode Plate]

In the secondary battery of this application, the positive-electrode plate includes a positive-electrode current collector and a positive-electrode film layer that is provided on at least one surface of the positive-electrode current collector and that includes a positive-electrode active material. For example, the positive-electrode current collector has two surfaces opposite in its thickness direction, and the positive-electrode film layer is provided on either or both of the two opposite surfaces of the positive-electrode current collector.

In the secondary battery of this application, a positive-electrode active material for the secondary battery known in the art can be used as the positive-electrode active material. For example, the positive-electrode active material may include one or more of lithium transition metal oxide, olivine-structured lithium-containing phosphate, and respective modified compounds thereof. Examples of the lithium transition metal oxide may include, but are not limited to, one or more of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and modified compounds thereof. Examples of the olivine-structured lithium-containing phosphate may include, but are not limited to, one or more of lithium iron phosphate, lithium iron phosphate-carbon composite, lithium manganese phosphate, lithium manganese phosphate-carbon composite, lithium iron manganese phosphate, lithium iron manganese phosphate-carbon composite, and respective modified compounds thereof. This application is not limited to these materials, and other conventionally known materials that can be used as positive-electrode active materials for secondary batteries can also be used.

In some optional implementations, in order to further increase the energy density of the battery, the positive-electrode active material may include one or more of the lithium transition metal oxides shown in Formula 1 and modified compounds thereof.

$$Li_aNi_bCo_cM_dO_eA_f \qquad \text{Formula 1}$$

In Formula 1, $0.8 \leq a \leq 1.2$, $0.5 \leq b < 1$, $0 < c < 1$, $0 < d < 1$, $1 \leq e \leq 2$, or $0 \leq f \leq 1$, where M is selected from one or more of Mn, Al, Zr, Zn, Cu, Cr, Mg, Fe, V, Ti, and B; and A is selected from one or more of N, F, S, and Cl.

In this application, the modified compounds of the foregoing materials may be modified by doping or surface coating on the positive-electrode active material.

In the secondary battery of this application, the positive-electrode film layer usually includes the positive-electrode active material and optionally a binder, optionally a conductive agent, and is usually obtained through drying and cold pressing after a positive-electrode slurry is applied. The positive-electrode slurry is usually obtained by dispersing the positive-electrode active material and optionally a conductive agent, a binder, or the like in a solvent and stirring uniformly. The solvent may be N-methylpyrrolidone (NMP).

As an example, the binder for the positive-electrode film layer may include one or more of polyvinylidene fluoride (PVDF) and polytetrafluoroethylene (PTFE).

As an example, the conductive agent for the positive-electrode film layer may include one or more of superconducting carbon, carbon black (for example, acetylene black or Ketjen black), carbon dots, carbon nanotube, graphene, and carbon nanofiber.

In the secondary battery of this application, the positive-electrode current collector may use a metal foil or a composite current collector (a metal material may be provided on a polymer matrix to form the composite current collector). As an example, the positive-electrode current collector may use an aluminum foil.

[Electrolyte]

The secondary battery of this application has no specific limitation on a type of the electrolyte, which can be selected as required. For example, the electrolyte may be selected from at least one of solid electrolyte and liquid electrolyte (that is, electrolyte).

In some implementations, the electrolyte uses a liquid electrolyte. The electrolyte includes an electrolytic salt and a solvent.

In some implementations, the electrolytic salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bisfluorosulfonyl imide), LiTFSI (lithium bis-trifluoromethanesulfon imide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate).

In some implementations, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), methyl ethyl sulfone (EMS), and diethyl sulfone (ESE).

In some implementations, the electrolyte further optionally includes an additive. For example, the additive may include a negative-electrode film forming additive, or may include a positive-electrode film forming additive, or may include an additive capable of improving some performance of a battery, for example, an additive for improving overcharge performance of the battery, an additive for improving high-temperature performance of the battery, and an additive for improving low-temperature performance of the battery.

[Separator]

In secondary batteries using the liquid electrolyte and some secondary batteries using the solid electrolyte, separators are also included. The separator is provided between the positive-electrode plate and the negative-electrode plate, and plays a role of isolation. There is no particular limitation on the type of the separator in this application, and any known porous-structure separator with good chemical stability and mechanical stability can be selected. In some implementations, a material of the separator may be selected from one or more of glass fiber, non-woven fabric, polyethylene, polypropylene, and polyvinylidene fluoride. The separator may be a single-layer thin film or a multi-layer composite film. When the separator is a multi-layer composite film, each layer may be made of the same or different materials.

In some implementations, the positive-electrode plate, the negative-electrode plate, and the separator may be made into an electrode assembly through wounding or lamination.

In some implementations, the secondary battery may include an outer package. The outer package may be used to encapsulate the foregoing electrode assembly and electrolyte.

In some implementations, the outer package of the secondary battery may be a hard shell, for example, a hard plastic shell, an aluminum shell, or a steel shell. The outer package of the secondary battery may alternatively be a soft pack, for example, a soft pouch. A material of the soft pack may be plastic, for example, one or more of polypropylene (PP), polybutylene terephthalate (PBT), polybutylene succinate (PBS), and the like.

Figure 5:
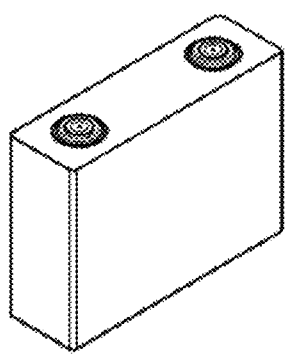
FIG. 5 is a schematic diagram of a secondary battery according to an embodiment.

This application does not impose any special limitations on a shape of the secondary battery, and the lithium-ion battery may be of a cylindrical shape, a rectangular shape, or any other shapes. FIG. 5 shows a secondary battery 5 with a rectangular structure in an example.

Figure 6:
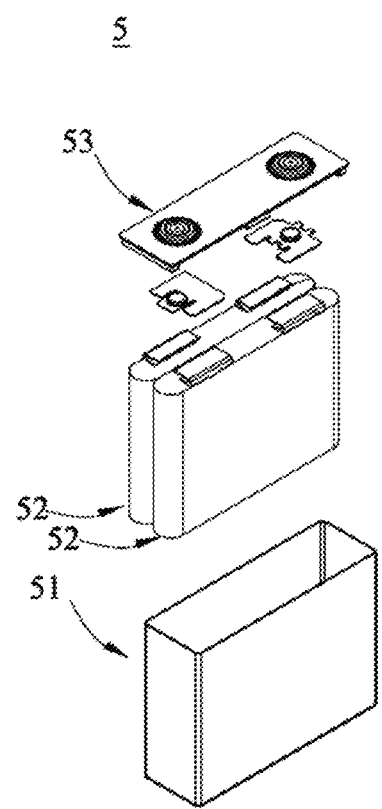
FIG. 6 is an exploded view of FIG. 5.

In some implementations, referring to FIG. 6, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 covers the opening to close the accommodating cavity. A positive-electrode plate, a negative-electrode plate, and a separator may be made into an electrode assembly 52 through winding or lamination. The electrode assembly 52 is encapsulated into the accommodating cavity. The electrolyte is infiltrated into the electrode assembly 52. There may be one or more electrode assemblies 52 in the secondary battery 5, and the quantity may be adjusted as required.

In some implementations, the secondary batteries may be assembled into a battery module. The battery module may include a plurality of secondary batteries, and a specific quantity may be adjusted based on application and capacity of the battery module.

Figure 7:
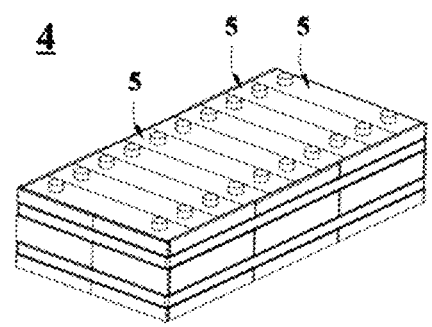
FIG. 7 is a schematic diagram of a battery module according to an embodiment.

FIG. 7 shows a battery module 4 in an example. Referring to FIG. 7, in the battery module 4, a plurality of secondary batteries 5 may be sequentially arranged in a length direction of the battery module 4. Certainly, an arrangement may be made in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some implementations, the battery module may be further assembled into a battery pack, and a quantity of battery modules included in the battery pack may be adjusted based on application and capacity of the battery pack.

Figure 8:
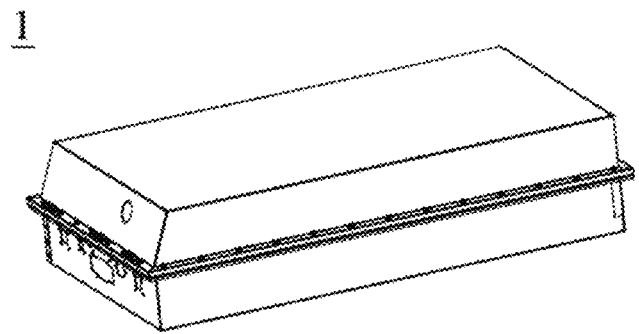
FIG. 8 is a schematic diagram of a battery pack according to an embodiment.
Figure 9:
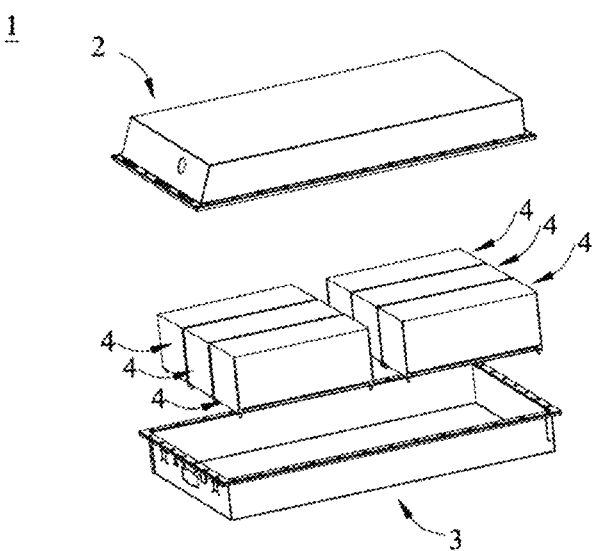
FIG. 9 is an exploded view of FIG. 8.

FIG. 8 and FIG. 9 show a battery pack 1 in an example. Referring to FIG. 8 and FIG. 9, the battery pack 1 may include a battery box and a plurality of battery modules 4 arranged in the battery box. The battery box includes an upper box body 2 and a lower box body 3. The upper box body 2 is configured to cover the lower box body 3 to form a closed space for accommodating the battery modules 4. The plurality of battery modules 4 may be arranged in the battery box in any manner.

Apparatus

This application further provides an apparatus. The apparatus includes at least one of the secondary battery, the battery module, or the battery pack according to this application. The secondary battery, the battery module, or the battery pack may be used as a power source of the apparatus, or an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like. A secondary battery, a battery module, or a battery pack may be selected for the apparatus according to requirements for using the apparatus.

Figure 10:
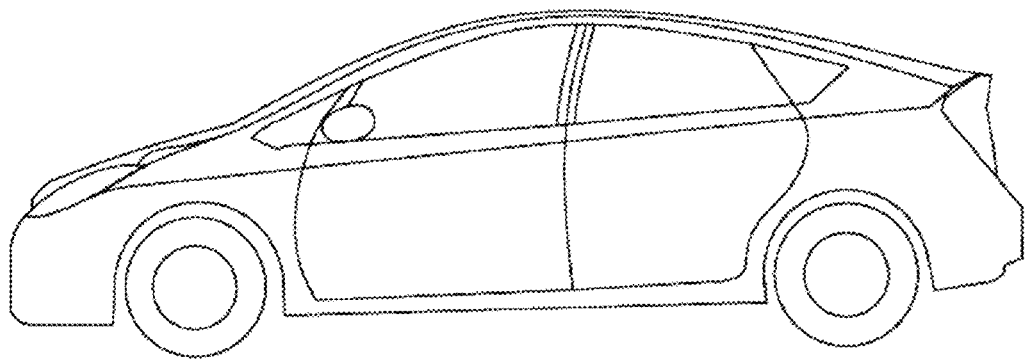
FIG. 10 is a schematic diagram of an apparatus using a secondary battery as a power source according to an embodiment.

FIG. 10 shows an apparatus in an example. The apparatus is a battery electric vehicle, a hybrid electric vehicle, a plug-in hybrid electric vehicle, or the like. To meet requirements of the apparatus for high power and a high energy density, a battery pack or a battery module may be used.

In another example, the apparatus may be a mobile phone, a tablet computer, a notebook computer, or the like. The apparatus is usually required to be light and thin, and the secondary battery may be used as a power source.

EXAMPLES

Content disclosed in this application is described in more details in the following examples. These examples are intended only for illustrative purposes because various modifications and changes made without departing from the scope of the content disclosed in this application are apparent to those skilled in the art. Unless otherwise stated, all parts, percentages, and ratios reported in the following examples are based on weights, all reagents used in the examples are commercially available or synthesized in a conventional manner, and can be used directly without further processing, and all instruments used in the examples are commercially available.

I. Preparation of the Battery

Example 1

Preparation of the Negative-Electrode Active Material

Petroleum green coke was used, with a volatile content $C_1$ being 7.87%. The petroleum green coke was pulverized to obtain a coke raw material with $D_v50$ of 11.8 μm and $D_v99$ of 20.1 μm.

Shaping and classification were performed on the coke raw material to obtain a precursor with $D_v50$ of 13.0 μm and $D_v99$ of 21.3 μm.

The precursor was granulated by using a binder pitch, and an amount of the binder $C_2$ was 5%. The resulting granulated product had $D_v50$ of 13.7 μm and $D_v99$ of 21.9 μm.

Graphitization was performed on the granulated product at a temperature of 3000° C., followed by sieving, to obtain artificial graphite. $D_v99$ of the artificial graphite was 22.9 μm.

Then, the artificial graphite was coated with the organic carbon source pitch, graphitization treatment was performed, to obtain a negative-electrode active material, including an artificial graphite core and an amorphous carbon coating layer covering a surface of the artificial graphite core. An amount of the organic carbon source $C_3$ was 3%, and the negative-electrode active material satisfied $D_v50$ of 14.5 μm, $D_v99$ of 22.3 μm, and a gram capacity of 355.2 mAh/g.

Preparation of the Negative-Electrode Plate

The negative-electrode active material prepared above, a binder styrene-butadiene rubber (SBR), a thickener sodium carboxymethyl cellulose (CMC-Na), and a conductive agent carbon black (Super P) were fully stirred and mixed in an appropriate amount of deionized water in a weight ratio of 96.2:1.8:1.2:0.8, to form a uniform negative-electrode slurry; and the negative-electrode slurry was applied on a surface of a copper foil negative-electrode current collector, followed by drying, cold pressing, slitting, and cutting, to obtain a negative-electrode plate. A compacted density of the negative-electrode plate was 1.65 g/cm³, and an areal density was 123 g/m².

Preparation of the Positive-Electrode Plate

Lithium nickel cobalt manganese oxide $LiNi_{0.8}Co_{0.1}Mn_{0.1}O_2$ (NCM811), a conductive agent carbon black (Super P), and a binder PVDF were fully stirred and mixed in an appropriate amount of N-methylpyrrolidone (NMP) in a weight ratio 97.5:1.5:1, to form a uniform positive-electrode slurry; and the positive-electrode slurry was applied on a surface of an aluminum foil positive-electrode current collector, followed by drying, cold pressing, slitting, and cutting, to obtain a positive-electrode plate. A compacted density of the positive-electrode plate was 3.5 g/cm³, and an areal density was 196 g/m².

Separator

A polyethylene (PE) film was used as a separator.

Preparation of the Electrolyte

Ethylene carbonate (EC), ethyl methyl carbonate (EMC), and diethyl carbonate (DEC) were mixed at a volume ratio of 1:1:1, and then fully dried lithium salt $LiPF_6$ was uniformly dissolved in the foregoing solution to obtain an electrolyte, where the concentration of $LiPF_6$ was 1 mol/L.

Preparation of the Secondary Battery

A positive-electrode plate, a separator, and a negative-electrode plate were stacked in order, and a reference electrode (where the reference electrode is used for subsequent performance testing of battery samples, and may be selected from a lithium sheet, lithium metal wire, or the like; and the reference electrode needs to be separated by the separator to avoid coming in contact with either side of the positive-electrode plate and the negative-electrode plate) was added between the separator and the negative-electrode plate. The stack was made into an electrode assembly through winding, the electrode assembly was encapsulated into an outer package, and the electrolyte was added, followed by the processes of encapsulation, standing, chemical formation, aging, and the like, to obtain a secondary battery.

The preparation methods in Examples 2 to 20 are similar to those in Comparative Example 1, with the only difference in preparation parameters of the negative-electrode active material. For details about different preparation parameters and product parameters, refer to Table 2 to Table 5.

II. Battery Performance Testing (1) Fast Charging Performance Testing

The secondary batteries prepared in the Examples and Comparative Examples were charged at 25° C. to 4.25V at a constant current of 1 C (that is, a current value at which a theoretical capacity is completely discharged in 1 h), charged to a current of 0.05 C at a constant voltage, left standing for 5 min, and then discharged to 2.8V at a constant current of 1 C; and an actual capacity was recorded as $C_0$.

Then, the batteries were charged to 4.25V or 0V negative cut-off potential (whichever comes first) successively at a constant current of 0.5 $C_0$, 1 $C_0$, 1.5 $C_0$, 2 $C_0$, 2.5 $C_0$, 3 $C_0$, 3.5 $C_0$, 4$C_0$, and 4.5 $C_0$, and needed to be discharged to 2.8V at 1 $C_0$ after each charge was completed. Corresponding negative potentials for charging to 10%, 20%, 30%, . . . , and 80% SOC (state of charge) at different charging rates were recorded, and rate-negative potential curves in different SOC states were drawn. Charging rates corresponding to the negative potential of 0V in different SOC states were obtained through linear fitting, and were denoted by $C_{20\%SOC}$, $C_{30\%SOC}$, $C_{40\%SOC}$, $C_{50\%SOC}$, $C_{60\%SOC}$, $C_{70\%SOC}$, and $C_{80\%SOC}$. According to a formula $(60/C_{20\%SOC}+60/C_{30\%SOC}+60/C_{40\%SOC}+60/C_{50\%SOC}+60/C_{60\%SOC}+60/C_{70\%SOC}+60/C_{80\%SOC})\times 10\%$, a charging time T (min) for charging the battery from 10% SOC to 80% SOC was obtained through calculation. A shorter time indicates better fast charging performance of the battery.

(2) Cycling Performance Testing

The secondary batteries prepared in the Examples and Comparative Examples were charged at 25° C. to 4.25V at a constant current of 0.33 C, charged to a current of 0.05 C at a constant voltage, left standing for 5 min, and then discharged to 2.8V at a constant current of 0.33 C; and an initial capacity was recorded as $C_0$. Then, the batteries were charged according to strategies in Table 1, and discharged at 0.33 C. A discharging capacity Co of each cycle was recorded, until a cycling capacity retention rate ($C_n/C_0\times 100\%$) became 80%; and then the number of cycles was recorded. A larger quantity of cycles indicates a longer cycle life of the battery.

TABLE 1

| State of charge SOC of battery | Charging rate (C) |
|---|---|
| 0-10% | 0.33 |
| 10%-20% | 3.8 |
| 20%-30% | 2.9 |
| 30%-40% | 2.4 |
| 40%-50% | 2.0 |
| 50%-60% | 1.7 |
| 60%-70% | 1.4 |
| 70%-80% | 1.2 |
| 80%-100% | 0.33 |

For details about test results of Examples 1 to 20 and Comparative Examples 1 and 2, refer to Table 3 and Table 5.

TABLE 2

| | Coke raw material | | | Precursor | | Granulation | | Artificial graphite obtained through graphitization | | Coating | $C_3 \times$ carbon |
|---|---|---|---|---|---|---|---|---|---|---|---|
| Sequence number | $D_v50$ (μm) | $D_v99$ (μm) | $C_1$ (%) | $D_v50$ (μm) | $D_v99$ (μm) | $D_v50$ (μm) | $D_v99$ (μm) | $D_v50$ (μm) | $D_v99$ (μm) | $C_3$ (%) | residue rate (%) |
| Example 1 | 11.8 | 20.1 | 7.87 | 13.0 | 21.3 | 13.7 | 21.9 | 12.2 | 22.9 | 3.00 | 2.10 |
| Example 2 | 11.2 | 18.7 | 7.15 | 12.2 | 19.9 | 12.9 | 20.1 | 11.4 | 21.8 | 3.30 | 2.31 |
| Example 3 | 9.7 | 17.6 | 7.56 | 11.3 | 18.9 | 11.8 | 19.0 | 10.2 | 20.8 | 3.00 | 2.10 |
| Example 4 | 8.2 | 17.5 | 7.43 | 9.8 | 18.2 | 10.5 | 19.7 | 9.3 | 20.0 | 3.50 | 2.45 |
| Example 5 | 7.5 | 17.1 | 7.00 | 9.3 | 17.9 | 10.1 | 19.2 | 8.8 | 19.6 | 3.00 | 2.10 |
| Example 6 | 7.3 | 16.4 | 7.88 | 8.9 | 17.0 | 9.7 | 18.3 | 8.5 | 18.5 | 3.80 | 2.66 |
| Example 7 | 7.1 | 15.9 | 6.67 | 8.5 | 16.4 | 9.2 | 17.1 | 7.5 | 17.5 | 2.20 | 1.53 |
| Comparative Example 1 | 12.3 | 30.0 | 6.76 | 13.2 | 34.0 | 14.2 | 38.3 | 12.7 | 38.6 | 3.00 | 2.10 |
| Comparative Example 2 | 15.1 | 36.4 | 6.23 | 15.1 | 38.1 | 16.3 | 47.6 | 14.8 | 48.1 | 3.20 | 2.24 |

TABLE 3

| | Negative-electrode active material | | | Battery performance | |
|---|---|---|---|---|---|
| | | | Gram | Fast charging | Cycling performance |
| Sequence number | $D_v99$ (μm) | $D_v50$ (μm) | capacity (mAh/g) | performance (min) | (number of cycles) |
| Example 1 | 22.3 | 14.5 | 355.2 | 20.8 | 1950 |
| Example 2 | 21.4 | 13.2 | 354.3 | 18.5 | 2320 |
| Example 3 | 20.3 | 12.4 | 353.6 | 17.4 | 2530 |
| Example 4 | 18.9 | 11.4 | 351.3 | 20.2 | 2005 |
| Example 5 | 18.4 | 10.5 | 350.7 | 20.4 | 1930 |
| Example 6 | 17.8 | 10.2 | 350.5 | 20.6 | 1830 |
| Example 7 | 16.3 | 8.3 | 348.7 | 18.8 | 2050 |
| Comparative Example 1 | 36.0 | 12.0 | 353.2 | 23.7 | 907 |
| Comparative Example 2 | 45.2 | 17.5 | 359.4 | 28.5 | 1270 |

As can be seen from the results in Table 3, the negative-electrode active material of this application includes the core and the coating layer covering the surface of the core, the core includes artificial graphite, the coating layer includes amorphous carbon, and the negative-electrode active material satisfies $D_v99 \leq 24$ μm and $8$ μm$\leq D_v50 \leq 15$ μm, thereby improving the fast-charging capability and cycling performance of the secondary battery using the negative-electrode active material under the condition of higher energy density.

In Comparative Example 1, both the fast-charging capability and the cycling performance of the secondary battery are relatively poor because the foregoing conditions are not satisfied.

TABLE 4

| | Preparation Parameters | | | | | | | | |
|---|---|---|---|---|---|---|---|---|---|
| | Coke raw material | | | | Precursor | | | Granulated product | |
| Sequence number | Type | $D_v50$ (μm) | $D_v99$ (μm) | $C_1$ (%) | $D_v50$ (μm) | $D_v99$ (μm) | $U_1$ (%) | $C_2$ (%) | A (%) |
| Example 7 | Petroleum green coke | 9.6 | 16.1 | 7.12 | 10.8 | 17.2 | 0.32 | 5.13 | 37.88 |
| Example 8 | Petroleum green coke | 9.2 | 17.2 | 7.56 | 10.3 | 18.3 | 0.38 | 5.25 | 33.05 |
| Example 9 | Petroleum green coke | 9.2 | 17.6 | 7.88 | 10.1 | 18.6 | 0.42 | 5.45 | 30.67 |
| Example 10 | Petroleum green coke | 9.4 | 19.2 | 7.14 | 10.5 | 20.3 | 0.45 | 5.16 | 26.98 |
| Example 11 | Petroleum green coke | 9.7 | 20.3 | 7.98 | 11.0 | 21.4 | 0.49 | 5.76 | 26.49 |
| Example 12 | Petroleum green coke | 9.9 | 18.4 | 7.56 | 11.2 | 20.2 | 0.55 | 6.21 | 25.02 |
| Example 13 | Petroleum green coke | 9.2 | 18.1 | 8.23 | 10.2 | 19.3 | 0.48 | 5.72 | 29.02 |
| Example 14 | Petroleum green coke | 10.5 | 17.5 | 7.45 | 11.6 | 18.5 | 0.43 | 4.31 | 27.33 |
| Example 15 | Petroleum green coke | 10.8 | 19.2 | 8.54 | 11.8 | 20.1 | 0.35 | 4.67 | 37.54 |

TABLE 4-continued

| | Preparation Parameters | | | | | | | | |
|---|---|---|---|---|---|---|---|---|---|
| Example 16 | Petroleum green coke | 10.1 | 20.4 | 6.78 | 11.2 | 21.1 | 0.33 | 2.25 | 27.21 |
| Example 17 | Petroleum green coke | 7.1 | 16.8 | 6.54 | 8.7 | 18.3 | 0.49 | 9.15 | 32.70 |
| Example 18 | Petroleum needle coke | 9.3 | 17.3 | 7.34 | 10.5 | 18.5 | 0.38 | 5.34 | 31.58 |
| Example 19 | Petroleum needle coke + petroleum green coke | 9.4 | 17.5 | 6.54 | 10.7 | 17.9 | 0.43 | 4.36 | 25.21 |
| Example 20 | Calcined petroleum coke | 9.6 | 17.2 | 8.54 | 10.9 | 18.2 | 0.34 | 2.61 | 42.90 |

| | Granulation | | Artificial graphite obtained through graphitization | | Coating | | | |
|---|---|---|---|---|---|---|---|---|
| Sequence number | $D_v50$ of granulated product (μm) | $D_v99$ of granulated product (μm) | $D_v50$ (μm) | $D_v99$ (μm) | $U_2$ (%) | $C_3$ (%) | $C_3 \times$ carbon residue rate (%) | B (%) |
| Example 7 | 12.5 | 18.1 | 11.1 | 19.3 | 0.27 | 3.00 | 2.1 | 56.00 |
| Example 8 | 11.9 | 19.2 | 10.5 | 20.3 | 0.33 | 3.00 | 2.1 | 47.15 |
| Example 9 | 12.2 | 20.1 | 10.6 | 21.6 | 0.38 | 3.00 | 2.1 | 41.79 |
| Example 10 | 12.0 | 21.3 | 10.3 | 22.4 | 0.39 | 3.00 | 2.1 | 38.82 |
| Example 11 | 12.8 | 22.4 | 11.3 | 23.2 | 0.45 | 3.00 | 2.1 | 35.51 |
| Example 12 | 13.0 | 23.2 | 11.9 | 23.1 | 0.36 | 3.30 | 2.31 | 47.39 |
| Example 13 | 12.4 | 22.1 | 11.0 | 20.3 | 0.35 | 2.80 | 1.95 | 47.80 |
| Example 14 | 12.9 | 18.6 | 11.5 | 21.2 | 0.35 | 3.20 | 2.24 | 42.71 |
| Example 15 | 13.4 | 20.7 | 11.9 | 22.3 | 0.33 | 2.90 | 2.03 | 48.61 |
| Example 16 | 12.8 | 21.4 | 11.7 | 23.4 | 0.35 | 3.30 | 2.34 | 35.09 |
| Example 17 | 10.2 | 22.3 | 9.2 | 23.5 | 0.46 | 1.80 | 1.26 | 38.70 |
| Example 18 | 11.9 | 19.2 | 10.6 | 20.6 | 0.33 | 3.00 | 2.10 | 45.45 |
| Example 19 | 12.3 | 18.6 | 10.9 | 20.1 | 0.35 | 3.20 | 2.27 | 40.11 |
| Example 20 | 12.7 | 18.9 | 11.3 | 19.7 | 0.31 | 2.20 | 1.53 | 54.20 |

In Table 4, A = $(C_1 + C_2)/U_1 \times 100\%$; and B = $(C_1 + C_2 + C_3)/U_2 \times 100\%$.

TABLE 5

| | Test Results | | | | | | | |
|---|---|---|---|---|---|---|---|---|
| | Negative-electrode active material | | | | | | Battery performance | |
| Sequence number | $D_v99$ (μm) | $D_v50$ (μm) | Particle size uniformity | Particle size specific surface area (m²/g) | Quantity proportion of the secondary particles | Gram capacity (mAh/g) | Fast charging performance (min) | Cycling performance (number of cycles) |
| Example 7 | 19.2 | 12.3 | 0.25 | 0.62 | 80% | 353.6 | 21.0 | 1980 |
| Example 8 | 20.1 | 12.6 | 0.32 | 0.53 | 80% | 353.4 | 17.3 | 2530 |
| Example 9 | 21.3 | 12.1 | 0.35 | 0.5 | 80% | 353.8 | 18.5 | 2320 |
| Example 10 | 22.3 | 11.3 | 0.38 | 0.47 | 80% | 352.6 | 20.2 | 2005 |
| Example 11 | 23.1 | 11.2 | 0.42 | 0.45 | 80% | 352.4 | 20.6 | 1830 |
| Example 12 | 23.6 | 14.1 | 0.34 | 0.68 | 90% | 353.2 | 21.5 | 2145 |
| Example 13 | 22.2 | 13.5 | 0.34 | 0.62 | 85% | 353.7 | 20.7 | 2217 |
| Example 14 | 21.3 | 12.2 | 0.34 | 0.51 | 75% | 353.3 | 18.9 | 2401 |
| Example 15 | 22.2 | 11.6 | 0.34 | 0.46 | 73% | 352.3 | 18.7 | 2524 |
| Example 16 | 23.1 | 12.3 | 0.34 | 0.42 | 72% | 352.4 | 19.5 | 2430 |
| Example 17 | 23.2 | 13.2 | 0.4 | 0.71 | 100% | 352.8 | 18.5 | 1901 |
| Example 18 | 20.3 | 12.6 | 0.32 | 0.53 | 80% | 353.3 | 17.4 | 2530 |
| Example 19 | 20.4 | 12.3 | 0.34 | 0.51 | 75% | 352.1 | 18.9 | 2401 |
| Example 20 | 20.5 | 11.3 | 0.3 | 0.48 | 60% | 351.7 | 20.6 | 2178 |

It can be seen from the results of Examples 7 to 11 that the negative-electrode active material with the particle size uniformity further being within an appropriate range can further improve the fast-charging capability and cycling performance of the battery.

It can be seen from the results of Examples 12 to 20 that the negative-electrode active material with the particle size specific surface area or the quantity proportion of the secondary particles further being within an appropriate range can further improve the fast-charging capability and cycling performance of the battery.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the protection scope of this application shall be subject to the protection scope of the claims.

What is claimed is:

1. A preparation method for a negative-electrode active material, comprising:
preparing a core material, wherein the core material comprises granulated artificial graphite;
mixing the core material with an organic carbon source; and
heat treating the mixed core material at 700-1800° C., to form the negative-electrode active material having an amorphous carbon coating layer covering at least part of surfaces of the core material, wherein a graphitization degree of the negative-electrode active material is 91.0%-96.0%;
wherein the granulated artificial graphite is prepared by a process that comprises:
pulverizing a coke raw material;
shaping the pulverized coke raw material to obtain a precursor;
granulating the precursor to obtain a granulated product, wherein the granulated product comprises primary particles and secondary particles, and the secondary particles are obtained by agglomerating independently dispersed primary particles; and
graphitizing the granulated product at a temperature of 2800° C. to 3200° C., to obtain the granulated artificial graphite,
wherein, after pulverization, a volume-based median particle size $D_v50$ of the coke raw material is 7 μm-12 μm, and a volume-based particle size distribution $D_v99$ of the coke raw material is 15 μm-21 μm;
wherein, after the shaping, a volume-based median particle size $D_v50$ of the precursor is 8 μm-13 μm, a volume-based particle size distribution $D_v99$ of the precursor is 16 μm-22 μm, and a particle size uniformity of the precursor $U_1$ satisfies $0.2 \leq U_1 \leq 0.55$;
wherein a volume-based median particle size $D_v50$ of the granulated product is 9 μm-15 μm, and a volume-based particle size distribution $D_v99$ of the granulated product is 17 μm-24 μm;
wherein a volume-based median particle size $D_v50$ of the granulated artificial graphite is 6 μm-14 μm, a volume-based particle size distribution $D_v99$ of the granulated artificial graphite is 17 μm-26 μm, and a particle size uniformity of the granulated artificial graphite $U_2$ satisfies $0.22 \leq U_2 \leq 0.48$; and
wherein a particle size specific surface area of the negative-electrode active material is 0.4 m²/g-0.75 m²/g.

2. The preparation method according to claim 1, wherein a volume-based median particle size $D_v50$ of the negative-electrode active material is 8 μm-15 μm, and
a volume-based particle size distribution $D_v99$ of the negative-electrode active material is ≤24 μm, and
a particle size uniformity of the negative-electrode active material is 0.25-0.45.

3. The preparation method according to claim 1, wherein the coke raw material contains an amount $C_1$ of volatile substances, and 1 wt % ≤ $C_1$ ≤ 12 wt % of the coke raw material;
wherein a binder is added to the precursor during granulating the precursor, an amount of the binder added to the precursor in weight percentage of the precursor is $C_2$, and $C_1$, $C_2$ and $U_1$ satisfy:

$$21 \leq (C_1+C_2)/U_1 \leq 50.$$

4. The preparation method according to claim 1, wherein the coke raw material comprises one or more of petroleum-based non-needle coke, petroleum-based needle coke, and petroleum green coke.

5. The preparation method according to claim 1, wherein a binder is added to the precursor during granulating the precursor, and the preparation method satisfies the following condition:

$$20 \leq (C_1+C_2+C_3)/U_2 \leq 56$$

wherein
$C_1$ is a weight percentage of volatile substances in the coke raw material,
$C_2$ is an amount of the binder added to the precursor in weight percentage of the precursor, and
$C_3$ is an amount of the organic carbon source mixed to the core material in weight percentage of the granulated artificial graphite.

6. The preparation method according to claim 2, wherein the volume-based median particle size $D_v50$ of the negative-electrode active material is 9 μm-13 μm, and
the volume-based particle size distribution $D_v99$ of the negative-electrode active material is 17 μm-24 μm.

* * * * *